(12) United States Patent
Georgis et al.

(10) Patent No.: US 11,405,544 B2
(45) Date of Patent: Aug. 2, 2022

(54) PROGRAMMABLE RIG CONTROL FOR THREE-DIMENSIONAL (3D) RECONSTRUCTION

(71) Applicant: SONY GROUP CORPORATION, Tokyo (JP)

(72) Inventors: Nikolaos Georgis, San Diego, CA (US); Gary Lyons, San Diego, CA (US); Edward Theodore Winter, San Diego, CA (US)

(73) Assignee: SONY GROUP CORPORATION, Tokyo (JP)

(*) Notice: Subject to any disclaimer, the term of this patent is extended or adjusted under 35 U.S.C. 154(b) by 0 days.

(21) Appl. No.: 17/181,799

(22) Filed: Feb. 22, 2021

(65) Prior Publication Data

US 2022/0116531 A1    Apr. 14, 2022

Related U.S. Application Data

(60) Provisional application No. 63/089,973, filed on Oct. 9, 2020.

(51) Int. Cl.

| | |
|---|---|
| *H04N 5/232* | (2006.01) |
| *H04N 5/247* | (2006.01) |
| *G06T 7/80* | (2017.01) |
| *H04R 1/40* | (2006.01) |
| *G06T 17/00* | (2006.01) |

(Continued)

(52) U.S. Cl.
CPC .......... *H04N 5/23203* (2013.01); *G06T 7/80* (2017.01); *G06T 17/00* (2013.01); *H04N 5/2256* (2013.01); *H04N 5/247* (2013.01); *H04R 1/406* (2013.01); *H04R 3/005* (2013.01);
(Continued)

(58) Field of Classification Search
CPC .. H04N 5/23203; H04N 5/2256; H04N 5/247; G06T 7/80; G06T 17/00; G06T 2207/20084; G06T 2207/30244; H04R 1/406; H04R 3/005; H04R 2201/401
See application file for complete search history.

(56) References Cited

U.S. PATENT DOCUMENTS 10,217,189 B2 * 2/2019 Russell ................ H04N 13/271
10,819,946 B1   10/2020 Tanumihardja et al.
(Continued)

FOREIGN PATENT DOCUMENTS

WO    2020/132631 A1    6/2020

*Primary Examiner* — Boubacar Abdou Tchoussou
(74) *Attorney, Agent, or Firm* — Chip Law Group

(57) ABSTRACT

An electronic device for programmable rig control for three-dimensional (3D) reconstruction is provided. The electronic device controls a first image sensor to capture a first image of a first scene which includes a set of subjects. The electronic device further feed a first input to a neural network. The electronic device further receives a first output from the neural network based on the fed first input. The electronic device further selects one or more image sensors based on the received first output. The electronic device further controls a first set of structures associated with the selected one or more image sensors to re-arrange a rig around a three-dimensional (3D) physical space. The electronic device further controls a first set of image sensors, in the re-arranged rig, to capture one or more images for generation of one or more three-dimensional (3D) models of a first subject in the 3D physical space.

20 Claims, 10 Drawing Sheets

(51) Int. Cl.
*H04N 5/225* (2006.01)
*H04R 3/00* (2006.01)

(52) U.S. Cl.
CPC ............... *G06T 2207/20084* (2013.01); *G06T 2207/30244* (2013.01); *H04R 2201/401* (2013.01)

(56) References Cited

U.S. PATENT DOCUMENTS

| | | | |
|---|---|---|---|
| 11,051,000 B2* | 6/2021 | Taguchi | G06T 7/80 |
| 11,165,957 B2* | 11/2021 | Thurston, III | G06T 5/005 |
| 2017/0076429 A1* | 3/2017 | Russell | H04N 5/23238 |
| 2018/0288390 A1 | 10/2018 | Luo | |
| 2021/0118180 A1* | 4/2021 | Zamora Esquivel | G06T 7/73 |
| 2022/0044478 A1* | 2/2022 | Tashiro | G06T 5/50 |

\* cited by examiner

PROGRAMMABLE RIG CONTROL FOR THREE-DIMENSIONAL (3D) RECONSTRUCTION

CROSS-REFERENCE TO RELATED APPLICATIONS/INCORPORATION BY REFERENCE

This application claims priority to U.S. Provisional Patent Application Ser. No. 63/089,973 filed on Oct. 9, 2020, the entire content of which is hereby incorporated herein by reference.

FIELD

Various embodiments of the disclosure relate to three-dimensional (3D) modeling and reconstruction. More specifically, various embodiments of the disclosure relate to an electronic device, a system, and method for programmable rig control for three-dimensional (3D) reconstruction.

BACKGROUND

Advancements in the field of three-dimensional (3D) computer graphics have provided an ability to create volumetric videos. Typically, a volumetric video corresponds to a process of capturing moving images of the real world such as people and objects (often referred as volumetric subjects) that can be later viewed from any angle at any moment in time. Volumetric videos are increasingly being used in animated movies, games, augmented-reality, virtual-reality, and mixed-reality systems to enhance user experience. Such volumetric videos are usually captured in a specialized capture studio (also known as a volumetric studio) that includes multiple image sensors, and other devices such as audio recording device(s), lighting system(s) and other structural parts (such as poles, panels, metals, or frames) that are often placed to form one or more rigs of the volumetric studio. To create the volumetric video of a volumetric subject, one or more 3D models of the volumetric subject are captured and processed.

Usually such volumetric studios are static and hence, the capture volume of the volumetric studio is definite and therefore can accommodate only a pre-defined number of volumetric subjects. Moreover, a variety of highly specialized image sensors and other devices are required for creation of the volumetric studio. Therefore, the bill of materials (BOM) or cost for creation of a single volumetric studio may be high. Also, the installation of various image sensors and other devices in the volumetric studio is difficult and time consuming. In certain situations, various image sensors and devices in the volumetric studio are pre-configured for a particular type of scene, and manual re-configuration (or rearrangement) of the image sensors and other devices/parts may be required for different scenes. In such situations, the process of manual re-configuration of the rigs of the volumetric studio may be time-consuming, tiresome, and expensive.

Limitations and disadvantages of conventional and traditional approaches will become apparent to one of skill in the art, through comparison of described systems with some aspects of the present disclosure, as set forth in the remainder of the present application and with reference to the drawings.

SUMMARY

An electronic device and method for programmable rig control for three-dimensional (3D) reconstruction is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
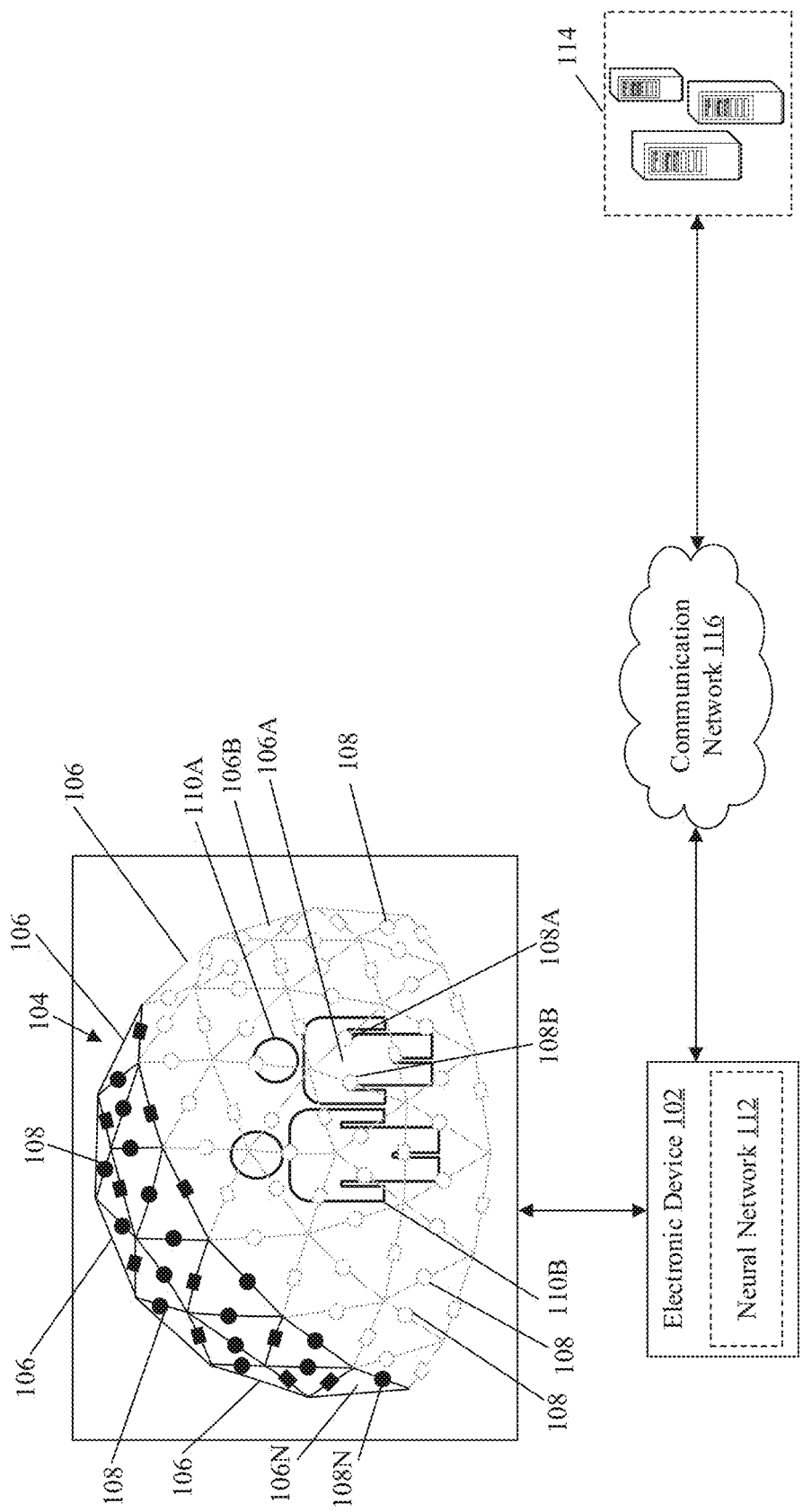
FIG. 1 is a diagram that illustrates an environment for programmable rig control for three-dimensional (3D) reconstruction, in accordance with an embodiment of the disclosure.

The following described implementations may be found in a disclosed electronic device, a system, and a method for programmable rig control for three-dimensional (3D) reconstruction. The disclosed electronic device may control an image sensor (such as a camera) positioned on a first structure of a plurality of structures that forms a rig around a 3D physical space (such as real-world space). The plurality of structures of the rig may form a volumetric studio around the 3D physical space. The first structure may be one segment (on which the image sensor may be mounted or pre-installed) of the plurality of structures of the rig. The image sensor may be controlled to capture an image of a scene (such as, but is not limited to, an action scene, a dance scene, or a sport scene) that includes a set of subjects (such as an animate or inanimate object, like humans and non-living objects) in the 3D physical space. The disclosed electronic device may further feed an input that includes the captured image of the scene to a neural network (such as, but is not limited to, a convolutional neural network). The disclosed electronic device may further receive an output from the neural network based on the fed input, where the received output may include information about a re-arrangement of the rig. The disclosed electronic device further selects one or more image sensors of a plurality of image sensors based on the received output and further control a set of structures (i.e. from the plurality of structures) associated with the selected one or more image sensors to re-arrange or reconfigure the rig around the 3D physical space. The disclosed electronic device may further control a first set of image sensors, in the re-arranged rig, to capture one or more images for further generation of one or more three-dimensional (3D) models of a first subject (such as an actor) of the set of subjects in the 3D physical space.

The disclosed electronic device may automatically control re-arrangement the rig based on real-time analysis of the scene in the 3D physical space, using the neural network. For real-time analysis, the electronic device (using the neural network) may assess different characteristics (such as, but is not limited to, type of scene, count of subjects, movement of at least one subject in 3D physical space, recognition of particular subject, emotional state of particular subject, or quality of the captured image or 3D model) of the scene in the 3D physical space. The re-arrangement of the rig may correspond to, for example, either an increase or a decrease in a count of the structures used in the rig, to further increase or decrease a volume of the volumetric capture of the physical 3D space surrounded by the re-arranged rig. The disclosed electronic device (using the neural network) may provide the output indicating the information (such as, but is not limited to, number of structures, number of image sensors, 3D position or orientation of a structure/image sensor, identifier of selected image sensors) for the re-arrangement of the rig. Therefore, the rig may be flexible and may be remotely deployed in a variety of environments (such as, but not limited to, a stadium or a studio). Moreover, the disclosed electronic device may also automatically adjust one or more parameters (such as, but not limited to, field-of-view (FOV), zoom, exposure, or focus) of the first set of image sensors to capture the subjects in the scene, based on the real-time analysis of the scene, as compared to manual adjustments done in the traditional rigs that can be cumbersome as well as time consuming. Further, the disclosed electronic device may also control the adjustment of a plurality of audio capture devices (i.e. microphones) and the plurality of light sources associated with the rig based on the real-time analysis of the scene. Therefore, the disclosed electronic device may be capable of remotely reconfigure the rig in real-time, to generate accurate 3D models of the subjects in the 3D physical space. Moreover, the disclosed electronic device (using the neural network), may allow easy and inexpensive re-arrangement and deploy-ability of the rig, in comparison to deployment (or re-arrangement) of the traditional rigs that may be expensive and time-consuming. In an embodiment, the disclosed electronic device may also control one or more unmanned aerial vehicles (UAVs) (i.e. which may hold or carry the plurality of structures of the rig) to capture the first scene of the 3D physical space. Thus, the dynamic or programmable rig of the volumetric studio (i.e. controlled by the disclosed electronic device) may be easily deployed in different areas (such as a stadium, a movie studio, a party venue, or other small/big physical spaces). Further, the electronic devices may also allow transmission of new features/updates to at least one of the plurality of image sensors, the plurality of audio capture devices and the plurality of light sources at once as compared to traditional volumetric rig, where the new features/updates are provided to each of the plurality of image sensors, the plurality of audio capture devices and the plurality of light sources one by one.

FIG. 1 is a diagram that illustrates an environment for programmable rig control for three-dimensional (3D) reconstruction, in accordance with an embodiment of the disclosure. With reference to FIG. 1, there is shown a diagram of a network environment 100. The network environment 100 includes an electronic device 102, a rig 104 that may include a plurality of structures 106. The rig 104 may be formed around a three-dimensional (3D) physical space. The plurality of structures 106 may include a first structure 106A, a second structure 106B, and an Nth structure 106N. With reference to FIG. 1, there is further shown a plurality of image sensors 108 may be installed on the plurality of structures 106 and may include a first image sensor 108A, a second image sensor 108B, and an Nth image sensor 108N. The plurality of image sensors 108 may be configured to capture a first image of a set of subjects that may include a first subject 110A, and a second subject 110B. With reference to FIG. 1, there is also shown a neural network 112, a server 114, and a communication network 116.

The electronic device 102 may include suitable logic, circuitry, interfaces, and/or code that may be configured to dynamically control the rearrangement of the rig 104 based on the real-time analysis of the scene including the set of subjects present in the 3D physical space. The set of subjects may include a first subject 110A and a second subject 110B, as shown in FIG. 1. The electronic device 102 (using the neural network 112) may control the volume of the volumetric studio formed by the rig 104, based on the rearrangement of different structures of the plurality of structures 106. The electronic device 102 may also control different imaging parameters of one or more of the plurality of image sensors 108 based on the real-time analysis of the scene in the 3D physical space surrounded by the rig 104. Examples of the electronic device 102 may include, but are not limited to, a volumetric capture controller, a volumetric studio controller, a three-dimensional (3D) graphic engine, a 3D modelling or simulation engine, computing device, a mainframe machine, a server, a computer work-station, a smartphone, a cellular phone, a mobile phone, a gaming device, a consumer electronic (CE) device and/or any other device with image processing capabilities.

The rig 104 may correspond to a physical device that may be used to mount the plurality of image sensors 108 together to a single 3D-system in order to capture a plurality of images of the scene. The rig 104 may be comprised of the plurality of structures 106. Each of the plurality of structures 106 may be in same shape (such as a triangular shape) or in different shape(s) depending on the requirement of the volumetric studio/capture. In some embodiments, each of the plurality of structures 106 may have same or different dimensions depending on the requirement of the volumetric studio/capture. The plurality of image sensors 108, and/or a plurality of audio capture devices (not shown), and/or a plurality of light sources (not shown) and/or other devices may be placed or pre-installed on the plurality of structures 106 that may form the rig 104. By way of example and not limitation, each structure may include at least one image sensor (represented by a circle in FIG. 1) and at least one processing device (represented by a rectangle in FIG. 1). As shown in FIG. 1, each structure (in triangular shape) may include few poles, rods, or frame (i.e. of a particular material, like metal, plastic, fiber) to hold at least one image sensor, at least one processing device, at least one audio capture device or a light source. Thus, different portable structures of same or different shapes may be easily combined or communicably joined to form the plurality of structures 106 of the rig 104 to further form the volumetric studio around the 3D physical space. In an embodiment, the processing device of one of the plurality of structures 106 may be the disclosed electronic device 102. In some embodiments, a virtual rig may also be created. In such an implementation, each of the plurality of structures 106 of the virtual rig may be mounted on an unmanned aerial vehicle (UAV) (such as a drone). Therefore, the plurality of image sensors 108, and/or the plurality of light sources and/or other devices may be mounted on a plurality of unmanned aerial vehicles (UAV's). The details about the virtual rig are provided, for example, in FIG. 8. It may be noted that the rig 104 shown in FIG. 1 as a dome shaped, is presented merely an example. The rig 104 may be in different shapes or arrangement, without a deviation from scope of the disclosure. It may be further noted that the black-colored image sensor (in circular shape) and processing device (in rectangular shape) and the grey-outlined image sensor (in circular shape) and processing device (in rectangular shape) may have similar capability and/or functionality. The grey-outlined components are shown in FIGS. 1, 4A-4B, 5A-5B, 6A-6B, and 7A-7B for better illustration of subjects within a rig (such as rig 104).

Each of the plurality of image sensors 108 include suitable logic, circuitry, and interfaces that may be configured to capture one or more images of the scene in the 3D physical space. Each of the plurality of image sensors 108 may be further configured to transmit the captured one or more images of the scene to the electronic device 102. Each of the plurality of image sensors 108 may receive different imaging parameters (for example, but not limited to, a FOV, zoom, focus, exposure, gain, orientation/tilt, ISO, brightness, etc.) from the electronic device 102. Examples of each of the plurality of image sensors 108 may include, but are not limited to, a depth sensor, a wide-angle camera, an action camera, a closed-circuit television (CCTV) camera, a camcorder, a digital camera, camera phones, a time-of-flight camera (ToF camera), a night-vision camera, and/or other image capture devices.

The set of subjects (including the first subject 110A) may be one or more animated and/or in-animated objects and may be present in the 3D physical space. The animated objects may correspond to a living objects that may possess a quality or an ability of motion whereas the in-animated objects may correspond to a non-living object that may lack the quality or the ability of motion. Examples of each of the set of subjects may include, but are not limited to, a human, an animal, or any non-living object (such as, but not limited to, a musical instrument, a sports object, a furniture item, or an electrical device).

The neural network 112 may be a computational network or a system of artificial neurons, arranged in a plurality of layers, as nodes. The plurality of layers of the neural network 112 may include an input layer, one or more hidden layers, and an output layer. Each layer of the plurality of layers may include one or more nodes (or artificial neurons). Outputs of all nodes in the input layer may be coupled to at least one node of hidden layer(s). Similarly, inputs of each hidden layer may be coupled to outputs of at least one node in other layers of the neural network 112. Outputs of each hidden layer may be coupled to inputs of at least one node in other layers of the neural network 112. Node(s) in the final layer may receive inputs from at least one hidden layer to output a result. The number of layers and the number of nodes in each layer may be determined from hyper-parameters of the neural network 112. Such hyper-parameters may be set before or while training the neural network 112 on a training dataset.

Each node of the neural network 112 may correspond to a mathematical function (e.g., a sigmoid function or a rectified linear unit) with a set of parameters, tunable during training of the network. The set of parameters may include, for example, a weight parameter, a regularization parameter, and the like. Each node may use the mathematical function to compute an output based on one or more inputs from nodes in other layer(s) (e.g., previous layer(s)) of the neural network 112. All or some of the nodes of the neural network 112 may correspond to same or a different same mathematical function.

In training of the neural network 112, one or more parameters of each node of the neural network 112 may be updated based on whether an output of the final layer for a given input (from the training dataset) matches a correct result based on a loss function for the neural network 112. The above process may be repeated for the same or a different input until a minima of loss function may be achieved and a training error may be minimized. Several methods for training are known in art, for example, gradient descent, stochastic gradient descent, batch gradient descent, gradient boost, meta-heuristics, and the like.

The neural network 112 may include electronic data, such as, for example, a software program, code of the software program, libraries, applications, scripts, or other logic or instructions for execution by a processing device, such as circuitry. The neural network 112 may include code and routines configured to enable a computing device, such as the electronic device 102 to perform one or more operations. Additionally or alternatively, the neural network 112 may be implemented using hardware including a processor, a microprocessor (e.g., to perform or control performance of one or more operations), a field-programmable gate array (FPGA), or an application-specific integrated circuit (ASIC). Alternatively, in some embodiments, the neural network 112 may be implemented using a combination of hardware and software. Although in FIG. 1, the neural network 112 is shown integrated within the electronic device 102, the disclosure is not so limited. Accordingly, in some embodiments, the neural network 112 may be a separate entity in the electronic device 102, without deviation from scope of the disclosure. In an embodiment, the neural network 112 may be stored in the server 114. Examples of the neural network 112 may include, but are not limited to, a deep neural network (DNN), a convolutional neural network (CNN), a CNN-recurrent neural network (CNN-RNN), R-CNN, Fast R-CNN, Faster R-CNN, an artificial neural network (ANN), (You Only Look Once) YOLO network, a fully connected neural network, and/or a combination of such networks.

The server 114 may include suitable logic, circuitry, and interfaces, and/or code that may be configured to store the captured images of the set of subjects. The server 114 may be further configured to store a count and a position (and an orientation) of the plurality of image sensors 108, the plurality of audio capture devices, and/or the plurality of light sources positioned on the plurality of structures 106 that may form the rig 104. In some embodiments, the server 114 may be further configured to store a count of the plurality of structures 106 in the rig 104. The server 114 may further store information about an equipment inventory 306. In some embodiments, the server 114 may store the neural network 112 and the 3D model generated for the one or more subjects in the 3D physical scene. The server 114 may be implemented as a cloud server and may execute operations through web applications, cloud applications, HTTP requests, repository operations, file transfer, and the like. Other example implementations of the server 114 may include, but are not limited to, a database server, a file server, a web server, a media server, an application server, a mainframe server, or a cloud computing server.

In at least one embodiment, the server 114 may be implemented as a plurality of distributed cloud-based resources by use of several technologies that are well known to those ordinarily skilled in the art. A person with ordinary skill in the art will understand that the scope of the disclosure may not be limited to the implementation of the server 114 and the electronic device 102 as two separate entities. In certain embodiments, the functionalities of the server 114 can be incorporated in its entirety or at least partially in the electronic device 102, without a departure from the scope of the disclosure.

The communication network 116 may include a communication medium through which the electronic device 102, the plurality of image sensors 108 (or other devices of the rig 104), and the server 114 may communicate with each other. The communication network 116 may be one of a wired connection or a wireless connection. Examples of the communication network 116 may include, but are not limited to, the Internet, a cloud network, a Wireless Fidelity (Wi-Fi) network, a Personal Area Network (PAN), a Local Area Network (LAN), or a Metropolitan Area Network (MAN). Various devices in the network environment 100 may be configured to connect to the communication network 116 in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

In operation, the electronic device 102 may be configured to control the first image sensor 108A that may be positioned on the first structure 106A of the plurality of structures 106. As discussed earlier, the plurality of structures 106 may form the rig 104 around the 3D physical space. In an embodiment, the electronic device 102 may be installed within the rig 104. In such an implementation, the electronic device 102 may be the processing device positioned on at least one of the plurality of structures 106. In another embodiment, the electronic device 102 may be associated with the rig 104. In such an implementation, the electronic device 102 may be external to the rig 104 and may control the plurality of image sensors 108 positioned on the plurality of structures 106, via the communication network 116. In some embodiments, the electronic device 102 may control the plurality of audio capture devices, and/or the plurality of light sources positioned on the plurality of structures 106 forming the rig 104, via the communication network 116.

The first image sensor 108A may be controlled to capture the first image of a first scene of the 3D physical space. Examples of the first scene may include a movie scene (i.e. an action scene, a comedy scene, a romantic scene, a suspense scene, a horror scene), a drama scene, a poetry scene, a sport scene, a play scene, a dance scene, an educational scene, a business-related scene, a musical performance scene, an adventure scene, or a party scene. The first scene may include the set of subjects in the 3D physical space. The captured first image may, therefore, include the set of subjects in the 3D physical space.

The electronic device 102 may be further configured to feed the captured first image, as a first input, to the neural network 112. The neural network 112 may be a pre-trained neural network that may be trained on a plurality of parameters to provide a first output for the re-arrangement of the rig 104. The plurality of parameters may include, but are not limited to, a count of the set of subjects, a movement of at least one subject of the set of subjects, a location of the at least one subject in the 3D physical space, a recognition of the at least one subject, an action of the at least one subject, an emotional state of a face of the at least one subject, an event in the 3D physical space, or historical information about the re-arrangement of the rig 104. The details about the neural network 112 and the plurality of parameters are provided, for example, in FIGS. 3, 4A, 4B, 5A, 5B, 6A, 6B, 7A, and 7B.

The electronic device 102 may receive the first output from the neural network 112. The first output may be received in response to the fed first input and may include information about the re-arrangement of the rig 104. By way of example and not limitation, the first output may include, but is not limited to, information about a number of structures required to re-arrange the rig 104, information about a number of image sensors in the re-arrange rig 104, information about a 3D position and orientation of each image sensor of the plurality of image sensors 108 required for the re-arrangement of the rig 104 around the 3D physical space, information about a first set of imaging parameters associated with one or more image sensors, or identification information about one or more image sensors. The details of the first output required for the rearrangement of the rig 104 are provided, for example, in FIGS. 4A-4B, 5A-5B, 6A-6B, and 7A-7B.

The electronic device 102 may be further configured to select one or more image sensors of the plurality of image sensors 108. The one or more image sensors may be selected based on the received first output from the neural network 112. The one or more image sensors may be selected for the rearrangement of the rig 104. For example, the one or more image sensors may be selected to change the 3D position/orientation or imaging parameters of the selected image sensor, or to remove/add the selected image sensor (or associated structure) in the rearranged rig 104. The electronic device 102 may further determine a first set of structures associated with the selected one or more image sensors. The determined first set of structures include the structures on which the selected one or more image sensors may be positioned. Based on the determination, the electronic device 102 may control the determined first set of structures. The first set of structures may be controlled to re-arrange the rig 104 around the 3D physical space. In an embodiment, the control of the first set of structures may correspond to a removal of the first set of structures from the rig 104 to further update the plurality of structures 106 in the rig 104 based on the removal. In another embodiment, the control of the first set of structures may correspond to an addition of the first set of structures in the rig 104 to further update the plurality of structures 106 in the rig 104 based on the addition. In an embodiment, the electronic device 102 may receive a user input from a user device associated with an operator of the rig 104. The received user input may include information (such as identifier) about the one or more image sensors or information about the first set of structures. The electronic device 102 may further control the first set of structures based on the received user input to re-arrange the rig 104 around the 3D physical space. The details of the rearrangement of the rig 104 are provided, for example, in FIGS. 4A-4B, 5A-5B, 6A-6B, and 7A-7B.

Based on the control the first set of structures, the electronic device 102 may be configured to control the first set of image sensors (i.e. from the plurality of image sensors 108), in the re-arranged rig 104, to capture one or more images of a scene of the 3D physical space surrounded by the rearranged rig 104. The one or more captured images captured in the rearranged rig 104 may be used for the generation of the one or more 3D models of at least the first subject 110A of the set of subjects in the 3D physical space. The generated one or more 3D models of the first subject 110A may be further rendered on a display device associated with the electronic device 102.

It may be noted here that the shape (i.e. dome shape) of the rig 104 as shown in FIG. 1 is presented merely as an example. The present disclosure may be also applicable to other shapes of the rig 104, without deviation from the scope of the disclosure. It may be further noted that a position and an orientation of the plurality of image sensors 108 and a plurality of processing devices positioned on the plurality of structures 106 as shown in FIG. 1 is presented merely as an example. The present disclosure may be also applicable to other positions and orientations of the plurality of image sensors 108 and the plurality of processing devices, without deviation from the scope of the disclosure.

Figure 2:
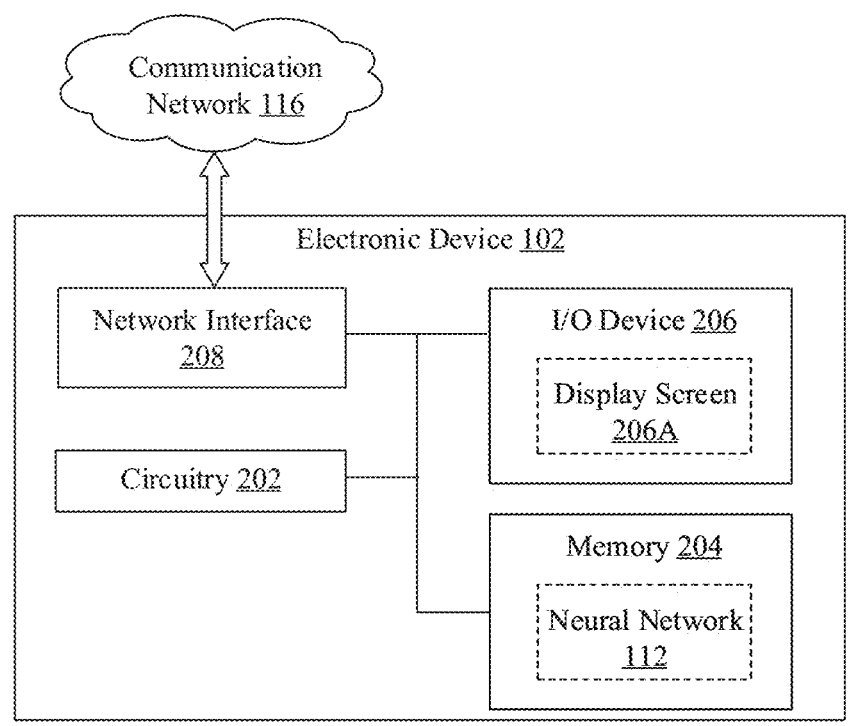
FIG. 2 is an exemplary block diagram of the electronic device of FIG. 1, in accordance with an embodiment of the disclosure.

FIG. 2 is an exemplary block diagram of the electronic device of FIG. 1, in accordance with an embodiment of the disclosure. FIG. 2 is explained in conjunction with elements from FIG. 1. With reference to FIG. 2, there is shown a block diagram 200 of the electronic device 102. The electronic device 102 may include circuitry 202, a memory 204, an input/output (I/O) device 206, and a network interface 208. With reference to FIG. 2, there is further shown a display screen 206A, and the neural network 112. The circuitry 202 may be communicatively coupled to the memory 204, the I/O device 206, and the network interface 208.

The circuitry 202 may comprise suitable logic, circuitry, and interfaces that may be configured to execute instructions stored in the memory 204. The executed instructions may correspond to a set of image processing operations for generation of the 3D model for a volumetric image/video of the first subject 110A of the set of subjects in the 3D physical space by control of a programmable rig (such as the rig 104). The circuitry 202 may be implemented based on a number of processor technologies known in the art. Examples of the circuitry 202 may include, but are not limited to, a Graphical Processing Unit (GPU), a co-processor, a Central Processing Unit (CPU), x86-based processor, a Reduced Instruction Set Computing (RISC) processor, an Application-Specific Integrated Circuit (ASIC) processor, a Complex Instruction Set Computing (CISC) processor, and a combination thereof.

The memory 204 may include suitable logic, circuitry, and/or interfaces that may be configured to store the program instructions executable by the circuitry 202. Additionally, the memory 204 may store information about a number of structures in the rig 104, information about the plurality of image sensors 108 positioned on the plurality of structures 106 of the rig 104, information about a 3D position and orientation of each image sensor of the plurality of image sensors 108, information about a set of imaging parameters associated with the each of the plurality image sensors 108, and a threshold resolution or quality of images captured by one or more image sensors. In at least one embodiment, the memory 204 may store the neural network 112. In another embodiment, the memory 204 may further store information about the plurality of audio capture devices/and or the plurality of light sources positioned on the plurality of structures 106 of the rig 104. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 206 may comprise suitable logic, circuitry, and/or interfaces that may be configured to act as an I/O channel/interface between the user and the electronic device 102. The I/O device 206 may be configured to receive a user input to generate the 3D model of at least the first subject 110A the set of subjects. In some embodiments, the electronic device 102 may receive user input, via the I/O device 206 to rearrange the rig 104. The I/O device 206 may comprise various input and output devices, which may be configured to communicate with different operational components of the electronic device 102. Examples of the I/O device 206 may include, but are not limited to, a touch screen, a keyboard, a mouse, a joystick, a microphone, and a display screen (for example, the display screen 206A).

The display screen 206A may comprise suitable logic, circuitry, and interfaces that may be configured to display one or more generated 3D models of the first subject 110A. In an embodiment, the display screen 206A may further display information about the rig 104, for example, but not limited to, a number of structures used, type of scene captured, or 3D position/orientation of different image sensors in the rig 104. In some embodiments, the display screen 206A may be an external display device associated with the electronic device 102. The display screen 206A may be a touch screen which may enable the user to provide the user input via the display screen 206A. The touch screen may be at least one of a resistive touch screen, a capacitive touch screen, or a thermal touch screen. The display screen 206A may be realized through several known technologies such as, but are not limited to, at least one of a Liquid Crystal Display (LCD) display, a Light Emitting Diode (LED) display, a plasma display, or an Organic LED (OLED) display technology, or other display devices. In accordance with an embodiment, the display screen 206A may refer to a display screen of a head mounted device (HMD), a smart-glass device, a see-through display, a projection-based display, an electro-chromic display, or a transparent display.

The network interface 208 may comprise suitable logic, circuitry, interfaces, and/or code that may be configured to establish communication between the electronic device 102, the rig 104, and the server 114, via the communication network 116. The network interface 208 may be configured to implement known technologies to support wired or wireless communication. The network interface 208 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer.

The network interface 208 may be configured to communicate via offline and online wireless communication with networks, such as the Internet, an Intranet, and/or a wireless network, such as a cellular telephone network, a wireless local area network (WLAN), personal area network, and/or a metropolitan area network (MAN). The wireless communication may use any of a plurality of communication standards, protocols and technologies, such as Global System for Mobile Communications (GSM), Enhanced Data GSM Environment (EDGE), wideband code division multiple access (W-CDMA), code division multiple access (CDMA), LTE, time division multiple access (TDMA), Bluetooth, Wireless Fidelity (Wi-Fi) (such as IEEE 802.11, IEEE 802.11b, IEEE 802.11g, IEEE 802.11n, and/or any other IEEE 802.11 protocol), voice over Internet Protocol (VoIP), Wi-MAX, Internet-of-Things (IoT) technology, Machine-Type-Communication (MTC) technology, a protocol for email, instant messaging, and/or Short Message Service (SMS).

The functions or operations executed by the electronic device 102, as described in FIG. 1, may be performed by the circuitry 202. Operations executed by the circuitry 202 are described in detail, for example, in FIGS. 3, 4A, 4B, 5A, 5B, 6A, 6B, 7, and 8.

Figure 3:
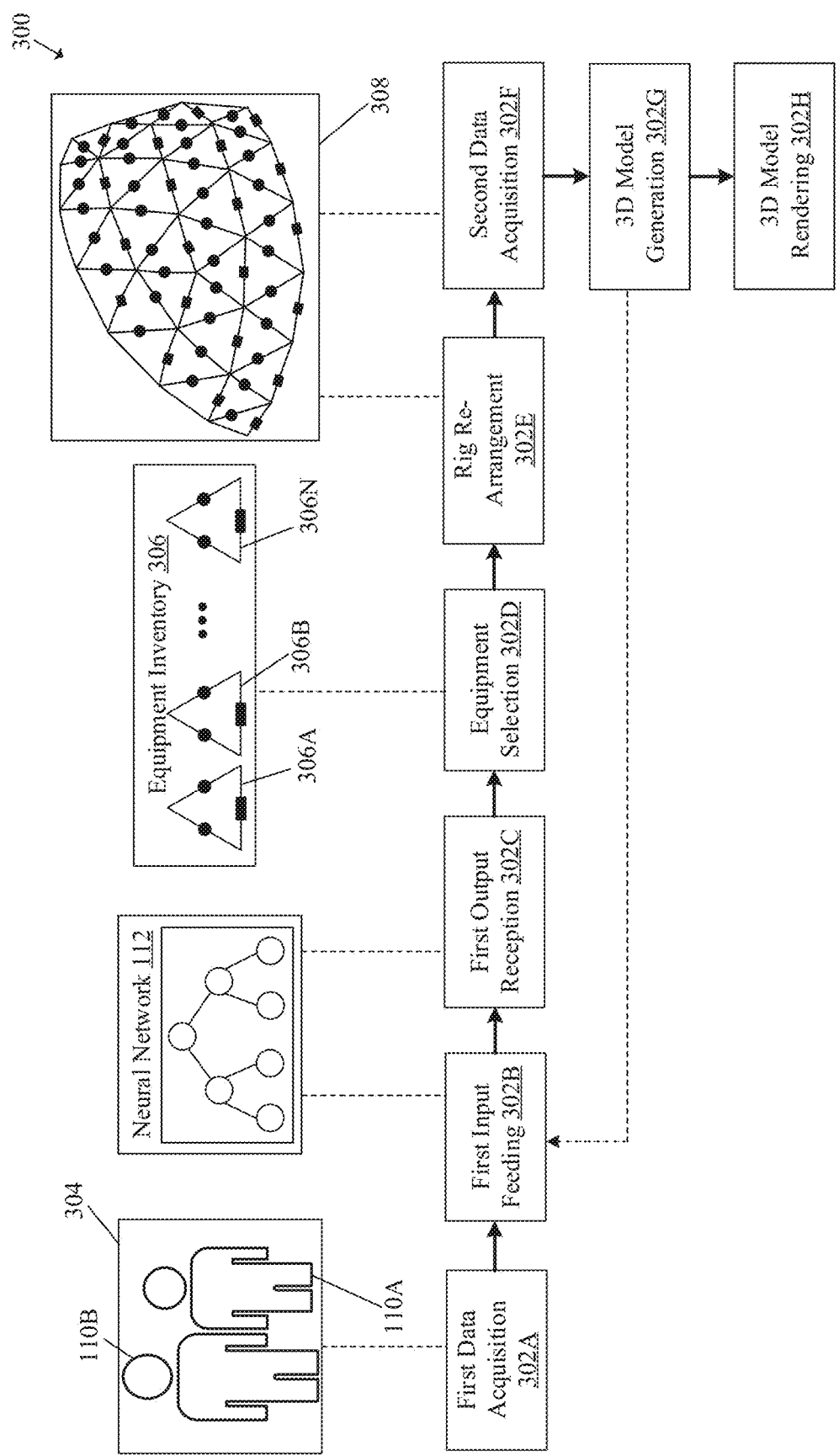
FIG. 3 is a diagram that illustrates exemplary operations for programmable rig control for three-dimensional (3D) reconstruction, in accordance with an embodiment of the disclosure.

FIG. 3 is a diagram that illustrates exemplary operations for programmable rig control for three-dimensional (3D) reconstruction, in accordance with an embodiment of the disclosure. FIG. 3 is explained in conjunction with elements from FIG. 1 and FIG. 2. With reference to FIG. 3, there is shown a block diagram 300 that illustrates exemplary operations from 302A to 302H, as described herein. The exemplary operations illustrated in the block diagram 300 may start at 302 and may be performed by any computing system, apparatus, or device, such as by the electronic device 102 of FIG. 1 or circuitry 202 of FIG. 2. Although illustrated with discrete blocks, the exemplary operations associated with one or more blocks of the block diagram 300 may be divided into additional blocks, combined into fewer blocks, or eliminated, depending on the particular implementation.

At 302A, a first data acquisition operation may be performed. In the first data acquisition operation, the circuitry 202 may control an image sensor (such as the first image sensor 108A) of the rig 104 (shown in FIG. 1) to capture a first image 304 of a first scene in the 3D physical space which may be surrounded or covered by the rig 104. The first scene may include the set of subjects in the 3D physical space. For example, the set of subjects may include the first subject 110A and the second subject 110B. In an embodiment, the first image sensor 108A may be positioned on a structure (such as the first structure 106A shown in FIG. 1) of the plurality of structures 106 that may form the rig 104 around the 3D physical space. In some embodiments, the circuitry 202 of the electronic device 102 may transmit a command, via the communication network 116, to the first image sensor 108A to capture the first image 304 of the first scene around the rig 104. The first image 304 may be captured for the real-time analysis of the first scene to further rearrange the rig 104 based on the analysis. The circuitry 202 may select the first image sensor 108A (i.e. to capture the first image 304) which may provide an appropriate view of the first scene or cover most of the set of subjects in the first scene, so that further analysis of the first scene may also be appropriate for the optimal re-arrangement of the rig 104.

At 302B, a first input feeding operation may be performed. In the first input feeding operation, the circuitry 202 may be configured to feed the first input to the neural network 112. The feed first input may include the captured first image 304. In some embodiments, the fed first input may also include information about the rig 104. Specifically, the information about the rig 104 may include, but is not limited to, information about the plurality of image sensors 108 positioned on respective structures of the rig 104. The information about the plurality of image sensors 108 may include, but is not limited to, a position (i.e. XYZ value) and an orientation (i.e. in degrees) of each of the plurality of image sensors 108, a set of values for a first set of imaging parameters associated with each of the plurality of image sensors 108, and/or an operational status (i.e. active or inactive) of each of the plurality of image sensors 108. Similarly, the first input may also include information about a plurality of audio capture devices and/or information about a plurality of light sources positioned on respective structures of the rig 104. The information about the plurality of audio capture devices may include, but is not limited to, a position and an orientation of each of the plurality of audio capture devices, a set of values for a set of audio parameters associated with each of the plurality of audio capture devices, and/or an operational status (i.e. active or inactive) of each of the plurality of audio capture devices. Similarly, the information about the plurality of light sources may include, but is not limited to, a position and an orientation of each of the plurality of light sources, a set of values for a set of lighting parameters associated with each of the plurality of light systems, and/or an operational status (i.e. active or inactive) of each of the plurality of light sources. The details about the first input are provided, for examples, in FIGS. 4A, and 4B.

In an embodiment, the neural network 112 may be applied on the received first input to generate a first output which may indicate information about a re-arrangement of the rig 104. The neural network 112 may be a pre-trained neural network 112 that may be trained on a plurality of parameters to provide the first output for the re-arrangement of the rig 104. The plurality of parameters may be indicated by the captured first image 304 (and by respective pixel information) in the received first input. The plurality of parameters may include, but are not limited to, a count of the set of subjects captured in the first image 304, a movement of at least one subject of the set of subjects, a location of at least one subject in the 3D physical space, a recognition of at least one subject, an action of at least one subject, an emotional state of a face of at least one subject, an event in the 3D physical space, or historical information about the re-arrangement of the rig.

The count of the set of subjects may correspond to a number of the set of subjects (for example a number of people or performers or players) present in the 3D physical space during the capture of the first image 304. The trained neural network 112 may analyze the captured first image 304 to identify the number of the set of subjects present in the captured first image 304. The recognition of at least one subject of the set of subjects may correspond to a facial recognition of at least one subject of the set of subjects. By way of example, the neural network may be trained on the facial recognition to recognize an actor (or any predefined person) among multiple persons in the scene in the 3D physical space, and therefore, may provide the first output to re-arrange the rig 104 based on the recognized person. The action may correspond to an act of a subject and may be determined based on a detected pose of the subject identified in the captured first image 304. By example, the poses may correspond to, but is not limited to, a dance pose, a fighting pose, a sport-related pose, running pose, an adventurous pose, a fitness-related pose, or other predefined poses of different body parts of the subject. Examples of emotional states of the face of at least one subject may include, but are not limited to, happiness, sadness, neutral, fear, disgust, anger, surprise, amusement, contempt, contentment, embarrassment, excitement, guilt, relief, satisfaction, shame, or shock. For example, the neural network 112 may be trained to provide the first output to re-arrange the rig 104 based on the detection of the pose or the emotional state of the face of the subject. The event in the 3D physical space may correspond to an occurrence of an activity in the 3D physical space. By way of example, the event may correspond to a goal in a football match being played in a stadium (i.e. the 3D physical space). In such a scenario, the neural network 112 may be configured to re-arrange the rig 104 to further capture one or more images of a player who scored the goal (i.e. event detect in the first image 304 by the neural network 112). Similarly, for different applications area (such as, not limited to, entertainment, movies, education, wild-life, business, sports, adventure, or manufacturing), different events may be predefined in the disclosed electronic device 102 or in the trained neural network 112. The historical information may include a plurality of past instances of inputs fed to the neural network 112 and outputs generated by the neural network 112 for the fed input instances to rearrange the rig 104 in the past. In some other embodiments, the neural network 112 may also be trained on a task of scene recognition. In such scenario, the neural network 112 may be fed with an image (such as the first image 304) as an input, and may be trained to recognize a type of the scene and provide the first output for the re-arrangement of the rig 104 based on the recognized scene type (such as movie scene, a sport scene, a performance scene, a party scene, a social activity scene, an educational scene, a conference/meeting, scene, an under-water scene, an adventurous scene, or a park scene). Certain exemplary scenarios about the rearrangement of the rig 104 based on different parameters are provided, for example, in FIGS. 4A-4B, 5A-5B, 6A-6B, and 7A-7B.

In another embodiment, the neural network 112 may be further trained to provide the first output for the re-arrangement of the rig 104 based on a first resolution of the captured first image 304. The neural network 112 or the circuitry 202 may be configured to determine the first resolution of the captured first image 304 and compare the determined first resolution with a threshold resolution. The threshold resolution may be a pre-defined bare minimum resolution of an input image that may be required for the generation of one or more 3D models of at least one subject of the set of subjects or that may be required to analyze the scene appropriately. In case the first resolution is less than the threshold resolution, the neural network 112 may be trained to re-arrange the rig 104 in such a way that a resolution of a second image captured after the re-arrangement of the rig 104 may be equal to or greater than the threshold resolution. In such a scenario, the first output of the neural network 112 for the rearrangement of the rig 104 may include a first set of values for at least one of the first set of imaging parameters associated with each of the plurality of image sensors 108. For example, the first output may indicate to increase a zoom (or change an orientation by predefined degrees) of a particular image sensor to improve the resolution of the captured image.

At 302C, the first output may be received. The first output may be received from the neural network 112 in response to the fed first input. The received first output may include, but is not limited to, information about a number of structures required to re-arrange the rig 104, information about a number of image sensors required to re-arrange the rig 104, information about a 3D position and an orientation of each image sensor of the first set of image sensors required for the re-arrangement of the rig 104 around the 3D physical space, information about a first set of imaging parameters associated with the selected one or more image sensors, or identification information about the selected one or more image sensors.

The information about the number of structures required to re-arrange the rig 104 may correspond to a count of structures that may be required to re-arrange the rig 104. In an embodiment, the number of structures may correspond to the count of structures that may be added or removed from the existing rig 104 for the re-arrangement of the rig 104. In another embodiment, the number of structures may correspond to a count of total number of structures in the re-arranged rig 104.

The information about the number of image sensors may correspond to a count of image sensors that may be required to re-arrange the rig 104. In an embodiment, the number of image sensors may correspond to the count of the image sensors that may be added or removed from the existing rig 104 for the re-arrangement of the rig 104. In another embodiment, the number of image sensors may correspond to a count of total number of image sensors in the re-arranged rig 104.

The information about the 3D position and the orientation of each image sensor of the first set of image sensors (i.e. out of the plurality of image sensors 108) may indicate the 3D position (in XYZ) and/or the orientation (in degrees) of corresponding image sensors. Based on such information, one or more images sensor (i.e. selected based on the neural network 112) may change their 3D position and/or orientation to rearrange the formation of the volumetric capture by the rig 104. For example, such information may include, but is not limited to, a first XYZ value for a position of each of the first set of image sensors in the 3D physical space and a second value for the orientation of each of the first set of image sensors in the 3D physical space. In some embodiments, the neural network 112 may provide information about changes in 3D positions and/or orientations of the image sensors or different selected structures of the rig 104 on which corresponding image sensor may be mounted to capture the scene within the 3D physical scene.

The information about the first set of imaging parameters associated with the selected one or more image sensors may include a value for each of the first set of imaging parameters. The first set of imaging parameters may include but is not limited to, a focus parameter, a field-of-view (FoV) parameter, a zoom parameter, an f-stop parameter, an exposure parameter, a shutter speed parameter, an aperture parameter, a gain parameter, a backlight parameter, a brightness parameter, a contrast parameter, a white balance parameter, a sharpness parameter, a ISO sensitivity parameter, a noise reduction parameter, a demosaic parameter, a denoise parameter, a color parameter, a high dynamic range (HDR) parameter, a rotation (a tilt or an orientation) parameter, or a deblur parameter. Thus, based on such information, the imaging parameters (i.e. intrinsic or extrinsic) of corresponding image sensors may be changed to modify or rearrange the volumetric capture performed by the rig 104. In an embodiment, the identification information about the selected one or more image sensors may correspond to a unique identifier (for example, but not limited to, an IP address, MAC address, or hardware ID) associated with each of the selected one or more image sensors. The neural network 112 may provide such information (as the first output) to select one or more image sensors or corresponding structure for the rearrangement of the rig 104 based on the analysis of the scene. For example, the selected image sensors or corresponding structure may be removed from the existing rig 104 to modify an area or volume of the 3D physical space covered by the modified rig 104.

In another embodiment, the first output may further include, but is not limited to, information about a number of audio capture devices required to re-arrange the rig, information about a 3D position and an orientation of each of first set of audio capture devices required for the re-arrangement of the rig around the 3D physical space, information about a number of light sources required to re-arrange the rig, information about a 3D position and an orientation of each of a first set of light sources required for the re-arrangement of the rig around the 3D physical space, information about a first set of audio parameters associated with the first set of audio capture devices, information about a first set of lighting parameters associated with the first set of light sources.

The information about the number of audio capture devices required to re-arrange the rig 104 may correspond to a count of audio capture devices (such as microphones) that may be required to re-arrange the rig 104. In an embodiment, the number of audio capture devices may correspond to the count of audio capture devices that may be added or removed from the rig 104 for the re-arrangement of the rig 104. In another embodiment, the number of audio capture devices may correspond to a count of total number of audio capture device in the re-arranged rig 104. For example, in certain situations to modify an audio capture quality of the scene, certain structures (i.e. which may carry the corresponding audio capture device) may be added, removed or modified (i.e. 3D position or orientation), and accordingly the rig 104 may be rearranged based on the addition, removal or modification of the selected structures or audio capture devices.

The information about the 3D position and the orientation of each of the first set of audio capture devices may include, but is not limited to, a first value (in XYZ) for a 3D position of each of the first set of audio capture devices in the 3D physical space and/or a second value for the orientation (in degrees) of each of the first set of audio capture devices in the 3D physical space. In some embodiments, such information may indicate 3D positions and/or orientations of the corresponding structures on which the selected audio capture devices are located (or mounted) to capture an audio of the scene in the 3D physical space.

The information about the number of light sources (for example a high intensity flash or stage lights) required to re-arrange the rig 104 may correspond to a count of light sources that may be required to re-arrange the rig 104. In an embodiment, the number of light sources may correspond to the count of light sources that may be added or removed from the rig 104 for the re-arrangement of the rig 104. In another embodiment, the number of light sources may correspond to a count of total number of light sources in the re-arranged rig 104. For example, in certain situations to control a lighting quality of the scene, certain structures (i.e. which may carry the corresponding light sources) may be added, removed, or modified; and accordingly the rig 104 may be rearranged based on the addition, removal or modification of the selected structures or light sources.

The information about the 3D position and the orientation of each of the first set of light sources required for the re-arrangement of the rig 104 around the 3D physical space may include, but is not limited to, a first value (in XYZ) for a 3D position of each of the first set of light sources in the 3D physical space and a second value for the orientation (in degrees) of each of the first set of light sources in the 3D physical space. In some embodiments, such information may indicate 3D positions and/or orientations of the corresponding structures on which the selected light sources are located (or mounted) to further control the lighting of a particular portion of the scene in the 3D physical space.

The information about the first set of audio parameters associated with the first set of audio capture devices may indicate a value for each of the first set of audio parameters associated with the first set of audio capture devices. By way of example and not limitation, the first set of audio parameters may include, but are not limited to, a sensitivity parameter, a directivity parameter, a signal to noise ratio parameter, a loudness parameter, a pitch parameter, a tone parameter, a rate-of-speech parameter, a voice quality parameter, a phonetic parameter, an intonation parameter, an intensity of overtones, a voice modulation parameter, a pronunciation parameter, a prosody parameter, a timbre parameter, or one or more psychoacoustic parameters. Similarly, the information about the first set of lighting parameters associated with the first set of light sources may indicate a value for each of the first set of lighting parameters associated with the first set of lighting systems. By way of example and not limitation, the first set of lighting parameters may include, but are not limited to, a brightness parameter, a contrast parameter, a hue parameter, a tint parameter, a shade parameter, a tone parameter, a color temperature parameter, or a saturation parameter.

At 302D, an equipment selection operation may be performed. In the equipment selection operation, the circuitry 202 may be configured to select one or more image sensors of the plurality of image sensors 108 based on the received first output from the neural network 112. In some other embodiments, the circuitry 202 may further select at least one of a first set of audio capture devices from the plurality of audio capture devices and/or a first set of light sources from the plurality of light sources based on the received first output, in addition to the selection of the one or more image sensors. For example, the circuitry 202 may select the one or more image sensors that may be removed from the existing rig 104 for the re-arrangement of the rig 104 after the removal of the selected one or more image sensors. The removal of the selected one or more image sensors (and corresponding structures on which image sensors are mounted) may reduce the volume of the 3D physical space covered by the rearranged rig 104.

In another embodiment, the circuitry 202 may select the one or more image sensors (i.e. positioned on a set of backup structures) from an equipment inventory 306 (as shown in FIG. 3), and the selected one or more image sensors may be added to the plurality of image sensors 108 in the rig 104 for the re-arrangement of the rig 104. The equipment inventory 306 may include the set of backup structures that can be added to the rig 104 based on the requirement. As shown, the set of backup structures may include, but are not limited to, a first backup structure 306A, a second backup structure 306B, and an Nth backup structure 306N. Each of the set of backup structures may include, at least one image sensor (represented by a circle), and at least one processing device (represented by a rectangle), and/or at least one audio record device (not shown), and/or at least one light source (not shown). The addition of the selected one or more image sensors (and corresponding structures on which image sensors are mounted) may increase the volume of the 3D physical space covered by the rearranged rig 104. Different exemplary scenarios for the addition or removal of the selected image sensors for the rearrangement of the rig 104 are provided, for example, in FIGS. 4A-4B, 5A-5B, 6A-6B, and 7A-7B. In some embodiments, each of the plurality of structures 106 (including the set of backup structures) may be carried by an unmanned aerial vehicle (UAV, such as a drone) which may be controlled by the disclosed electronic device 102 to rearrange the volume or area covered by the rig 104.

At 302E, a rig re-arrangement operation may be performed. In the rig re-arrangement operation, the circuitry 202 may be configured to re-arrange the rig 104. To re-arrange the rig 104, the circuitry 202 may control a first set of structures associated with (or carrying) the selected one or more image sensors to re-arrange the rig 104 around the 3D physical space. In an embodiment, where the first set of audio capture devices or the first set of light sources may be selected, the circuitry 202 may be configured to control a second set of structures that may be associated with the selected first set of audio capture devices or the selected first set of light sources. In an embodiment, the first set of structures may include structures on which the selected one or more image sensors may be positioned or mounted. Similarly, the second set of structures may include structures on which the selected first set of audio capture devices and/or the selected first set of light sources may be positioned or mounted. In an embodiment, the first set of structures may be from the plurality of structures 106 such the first set of structures may be removed or modified (for example change in 3D position or orientation) for the re-arrangement of the rig 104. In another embodiment, the first set of structures may be from the set of backup structures in the equipment inventory 306, such that the first set of structures may be added to the plurality of structures 106 for the re-arrangement of the rig 104.

The control of the first set of structures (and/or the second set of structures) may correspond to either removal of the first set of structures (and/or the second set of structures) from the rig 104 to further update the number of the plurality of structures 106 based on the removal, or may correspond to addition of the first set of structures (and/or the second set of structures) in the rig 104 to further update the number of the plurality of structures 106 based on the addition. Therefore, in a re-arranged rig 308 (as shown, for example, in FIG. 3), a count of structures may less or greater than a count of the plurality of structures 106 in the rig 104 (shown in FIG. 1).

In another embodiment, the rig 104 may be re-arranged based on change of a 3D position of the rig 104 from a first position to the second position while maintaining the same number of structures in the rig 104. In another embodiment, the rig 104 may be re-arranged based on change in the 3D position of the rig 104 from the first position to the second position by addition/removal of the first set of structures (or the second set of structures) from the rig 104. The details about the re-arrangement of the rig 104 are provided, for example, in FIGS. 4A, 4B, 5A, 5B, 6A, 6B, 7A, and 7B.

At 302F, a second data acquisition operation may be performed. In the second data acquisition operation, the circuitry 202 may be configured to control a first set of image sensors in the re-arranged rig 308 to capture one or more images of the first scene that may include the set of subjects in the 3D physical space. The first set of image sensors may be few image sensors from the plurality of image sensors 108 in the re-arranged rig 308 to capture the images of at least one subject in the 3D physical space covered by re-arranged rig 308. For example, the first set of image sensors (such as the first image sensor 108A and/or the second image sensor 108B shown in FIG. 1), may be those image sensors which may provide appropriate field of view (FOV) of the subject based on a specific need (for example, which side or body part of the subject to capture or focus, number of subjects to capture) of the volumetric capture. In an embodiment, each of the captured one or more images of the set of subjects may be a two-dimensional (2D) images or 3D images. The captured one or more images may also include a texture map of at least a subject (i.e. the first subject 110A) of the set of subjects. The texture map of the first subject 110A may be a 2D map (e.g., a U-V coordinate map) that may represent an appearance of the first subject 110A. The texture map of the first subject 110A may include texture information and color information of a surface of the first subject 110A.

At 302G, a 3D model generation operation may be performed. In the 3D model generation operation, the circuitry 202 may be configured to generate one or more 3D models of at least the first subject 110A of the set of subjects. A 3D model may be a 3D graphical model that may resemble the actual shape of the first subject 110A. Typically, the 3D model of the first subject 110A may be rendered from a 3D mesh that may use polygonal surfaces to define a shape and geometry of the first subject 110A. The 3D model of the first subject 110A may realistically represent the surface features of the first subject 110A.

The one or more 3D models may be generated based on the one or more images captured by the first set of image sensors (at 302F). To generate the one or more 3D models of the first subject 110A, the circuitry 202 may perform a pipeline of operations. The pipeline of operations may include, but are not limited to, an image sensor calibration operation, an alignment operation, a feature extraction operation, an image feature matching operation, a three-dimensional (3D) reconstruction operation, and a meshing operation. It may be noted that the pipeline of operations for the generation of the 3D model may further include sub-operations, which are omitted from the disclosure for the sake of brevity.

In the image sensor calibration operation, the circuitry 202 may be configured to estimate a set of intrinsic and/or extrinsic parameters associated with each of the first set of image sensors. Each of the set of intrinsic parameters may be associated with internal characteristics of the corresponding image sensor such as, but are not limited to, the focal length parameter, the skew parameter, the distortion parameter, and/or the image center parameter. The extrinsic parameters may describe a position and an orientation of the corresponding image sensor in the 3D physical space. Based on the estimation of the intrinsic and/or extrinsic parameters, the circuitry 202 may be configured to perform alignment operation. In the alignment operation, the circuitry 202 may be configured to calculate a position of each image sensor of the first set of image sensors based on the corresponding intrinsic and extrinsic parameters estimated in the calibration operation.

Based on the alignment of the first set of image sensors, the circuitry 202 may perform the feature extraction operation. In the feature extraction operation, the circuitry 202 may be configured to extract a set of features from each of the captured one or more images. The objective of the extraction of the set of features may be to extract distinctive groups of pixels that may be invariant, to some extent, for the change in camera viewpoints during the capture of the one or more images.

Further, based on the extraction of the set of features, the circuitry 202 may perform the image feature matching operation. In the image feature matching operation, the circuitry 202 may be configured to match all features between the candidate image pairs. The circuitry 202 may perform photometric matches between a set of descriptors from any two captured images of the one or more images. For each feature in any two captured images, the circuitry 202 may obtain a list of candidate features of the two captured images. To remove bad candidates, it may be assumed that there is only one valid match in the other image.

Based on the execution of the feature matching operation, the circuitry 202 may be configured to perform the 3D reconstruction operation. In the 3D reconstruction operation, the circuitry 202 may be configured to determine a geometric relationship behind all observations provided by the one or more captured images and infer a rigid scene structure (i.e. 3D points) with a pose (i.e. a position and an orientation) and internal calibration of each of the first set of image sensors which captured the one or more images. Based on inference of the rigid scene structure, the circuitry 202 may further retrieve one or more depth value of each pixel in the captured images.

In some embodiments, the circuitry 202 may match the extracted set of features in each image of the captured one or more images. Once the set of features matches up, the circuitry 202 may create three dimensional points in the 3D space. The created points in the 3D space may also contain color information. The circuitry 202 may repeat the same process for each of the set of features and creates the 3D points in the 3D space for each matched feature. Such points in the 3D space may create a sparse point cloud and form the rigid scene structure. The sparse point cloud may be further converted into a dense point cloud based on the retrieved depth value for each pixel. The one or more 3D models of the first subject 110A may be generated based on the dense point cloud. Further, based on the execution of the 3D reconstruction operation, the circuitry 202 may be configured to perform the meshing operation. In the meshing operation, the circuitry 202 may be configured to generate a dense geometric surface representation (i.e. the 3D model) of the first subject 110A and/or the first scene. It may be noted that the electronic device 102 may further distribute the execution of the pipeline of aforementioned operations among the processing devices of different structures in the rig 104. In some embodiments, the electronic device 102 may send the captured one or more images of the first subject 110A or the set of subjects to another processing device (like another server or graphic engine) to generate one or more 3D models based on the captured images of the scene within the rig 104 (or rig 308).

In an embodiment, the generated one or more 3D models of the first subject 110A may be provided as an input to the neural network 112. Based on the provided input about the generated 3D model, the neural network 112 may be further configured to provide an output to the circuitry 202 for the re-arrangement of the rig 308, to further enhance the quality of the generated one or more 3D models. Therefore, the disclosed electronic device 102 using the neural network 112 may also provide a feedback mechanism to gauge the quality of generated 3D models of the subject in the rig 308, and make real-time decisions to further re-arrange the rig 308 for the enhancement of the quality of 3D model to be generated in near future.

At 302H, a 3D model rendering operation may be performed. In the 3D model rendering operation, the circuitry 202 may be configured to render the generated one or more 3D models of the first subject 110A on the display screen 206A. In some embodiments, the generated one or more 3D meshes may be textured to generate one or more textured 3D models before rendering. The one or more textured 3D models may be generated by UV mapping of the texture map (i.e. received from the captured one or more images) on the one or more 3D models. In general, the UV mapping may correspond to a process of projecting one or more 2D images (texture map) onto a surface of the generated 3D model of the first subject 110A. In some embodiments, the one or more textured 3D meshes may be compressed for rendering (and/or exporting, and/or archiving, and/or transmission) of the one or more textured 3D meshes. In some exemplary scenarios, the generated one or more 3D models may be rendered in a Virtual Reality (VR) or Augmented Reality (AR) environment to represent the first subject 110A. The application of the 3D model may include, but is not limited to, animations in video games, Visual Effects (VFX), Computer-Generated Imagery (CGI), and a 3D model-based video conferencing.

In an embodiment, the circuitry 202 may be configured to control the plurality of image sensors 108 (and/or plurality of audio capture devices, and/or the plurality of light source) to update their corresponding firmware. The circuitry 202 may retrieve the corresponding firmware from the server 114 (or any other electronic device), via the communication network 116, and control the plurality of image sensors 108 (and/or plurality of audio capture devices, and/or the plurality of light source) to update the corresponding firmware(s) based on the retrieved firmware updates. Therefore, the disclosed electronic device 102 may be used to push new features (such as a feature to detect a region of interest (RoI)) and update (i.e. software or firmware) to different components of the rig 104.

Figure 4A:
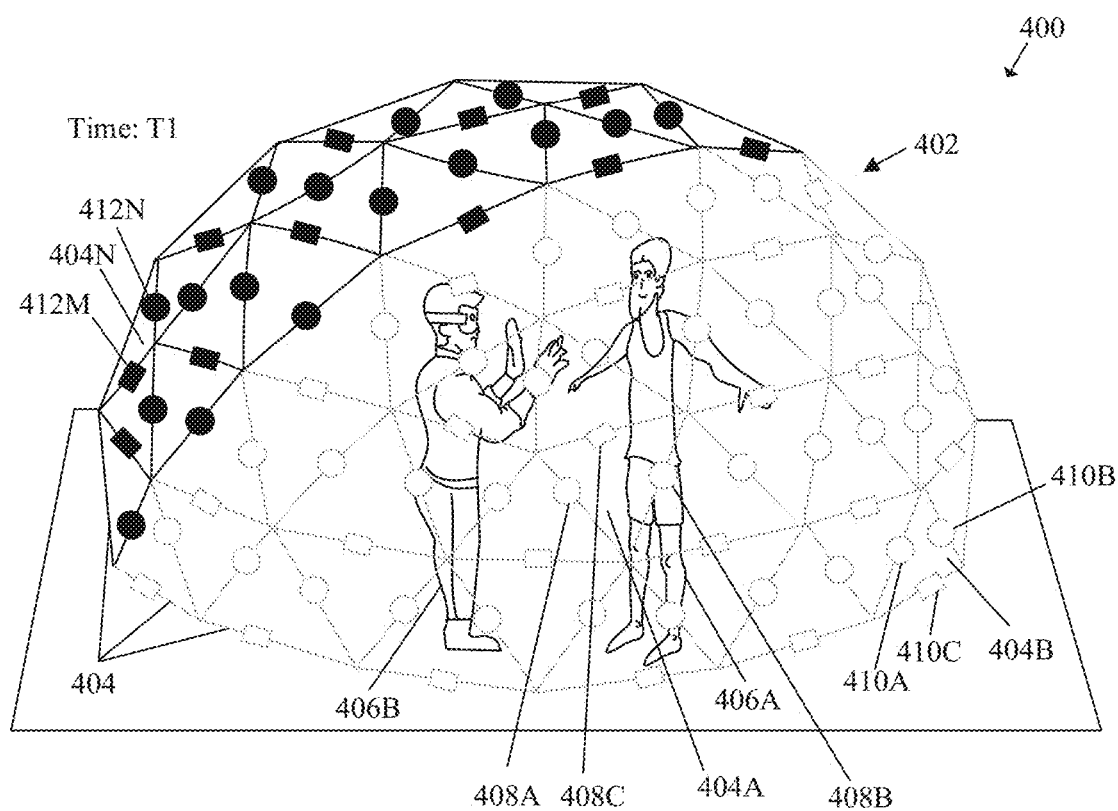
FIGS. 4A and 4B are diagrams that collectively depict an exemplary first scenario for programmable rig control for three-dimensional (3D) reconstruction, in accordance with an embodiment of the disclosure.
Figure 4B:
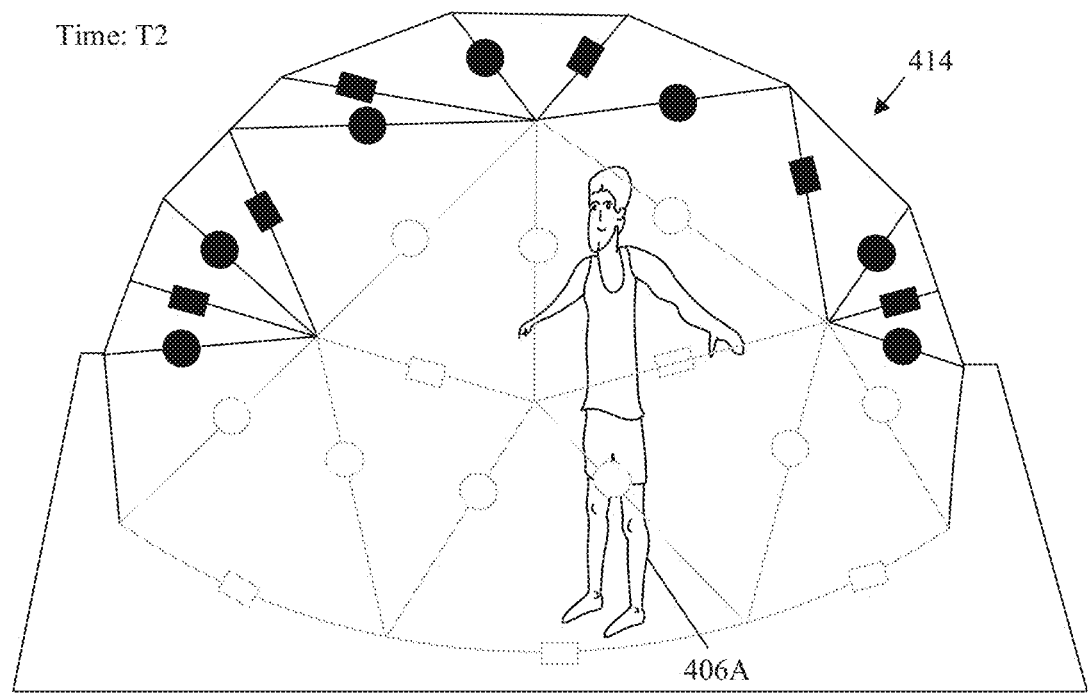

FIGS. 4A and 4B are diagrams that collectively depict an exemplary first scenario for programmable rig control for three-dimensional (3D) reconstruction, in accordance with an embodiment of the disclosure. FIGS. 4A and 4B are explained in conjunction with elements from FIGS. 1, 2, and 3. With reference to FIGS. 4A and 4B, there is shown an exemplary scenario 400 that includes a rig 402 composed of a plurality of structures 404 that may cover (and/or capture) a 3D physical space. FIG. 4A may represent a scenario at time "T1". With reference to FIG. 4A, there is further shown a set of subjects in the 3D physical space around which the rig 402 may be formed (for example in a dome shape). The set of subjects may include a first subject 406A, and a second subject 406B. FIG. 4B may represent a scenario at time "T2" (after time "T1").

The plurality of structures 404 may include, but is not limited to, the first structure 404A, the second structure 404B, and an Nth structure 404N. Each of the plurality of structures 404 may be triangular in shape and may include at least one image sensor and at least one processing device. In an embodiment, the processing device on one of the plurality of structures 404 may act as the electronic device 102. As shown, the first structure 404A may include a first image sensor 408A, a second image sensor 408B, and a first processing device 408C. The second structure 404B may include a third image sensor 410A, a fourth image sensor 410B, and a second processing device 410C. Similarly, the Nth structure 404N may include an Nth processing device 412M, and an Nth image sensor 412N.

With reference to FIG. 4A, at time "T1", a first scene may be captured by the rig 402. The first scene, for example, may be a movie scene which may include the first subject 406A and the second subject 406B. The first subject 406A may be an actor and the second subject 406B may be a co-actor. It may be assumed, for example, that the second subject 406B may be providing one or more instructions to the first subject 406A to perform a task. At the time of start of the first scene, the circuitry 202 may be configured to control at least an image sensor (for example the first image sensor 408A) to capture the first image of the first scene. As described, the first scene may include the set of subjects in the 3D physical space around which the rig 402 may be formed. The circuitry 202 may further feed the captured first image, as a first input, to the neural network 112. In some embodiments, the first input may further include information about the rig 402. The information about the rig 402 may include, but is not limited to, information about the plurality of structures 404, information about the plurality of image sensors, information about the plurality of audio capture devices, or information about the plurality of light sources as described, for example, in FIG. 3.

The information about the plurality of structures 404 may include, but is not limited to, first information about shape of each structure of the plurality of structures 404, second information about a length of each side of each structure of the plurality of structures 404, third information about an angle between every pair of sides of each structure of the plurality of structures 404, a count of the plurality of structures 404 in the existing rig 402, fourth information about 3D position and orientation of each of the plurality of structures 404 in the rig 402, a maximum count of structures that can form the rig 402, and identification information associated with each structure of the plurality of structures 404 as well as the set of backup structures that are/can be a part of the rig and/or a re-arranged rig.

The information about the plurality of image sensors may include, but is not limited to, identification information about each of the plurality of image sensors, first information associated with current 3D position and orientation of each of the plurality of image sensors, second information associated with the first set of imaging parameters of each of the plurality of image sensors, and third information about a set of specifications (i.e. the capture capabilities) of each of the plurality of image sensors. The information about the plurality of audio capture devices may include, but is not limited to, identification information about each of the plurality of audio capture devices, first information associated with 3D position and orientation of each of the plurality of audio capture devices, second information associated with the first set of audio parameters of each of the plurality of audio capture devices, and third information about a set of specifications (i.e. the audio capabilities) of each of the plurality of audio capture devices. Similarly, the information about the plurality of light sources may include, but is not limited to, identification information about each of the plurality of light sources, first information associated with 3D position and orientation of each of the plurality of light sources, second information associated with the first set of lighting parameters of each of the plurality of light sources, and third information about a set of specifications (i.e. the lighting capabilities) of each of the plurality of light sources.

The neural network 112 may receive the captured first image. In an embodiment, the neural network 112 may be configured to determine a count of the set of subjects in the captured first image (that are physically present in the first scene). In some embodiments, the neural network 112 may perform facial recognition of each of the set of subjects in the first scene along with the determination of the count of the set of subjects 406. As shown in FIG. 4A, the electronic device 102 (using trained the neural network 112) may determine the count of the set of subjects as 'two' and further recognize the first subject 406A as the 'actor' (or any other celebrity) and the second subject 406B as the 'co-actor'. The count of the set of subjects and the recognition of the subject may correspond to the plurality of parameters on which the neural network 112 may be pre-trained as described, for example, in FIG. 3 (at 302B).

Based on the fed information about the first scene (i.e. indicated by the captured first image), the information about the existing rig 402, and determined count of the set of subjects, and the recognition of the first subject 406A, and/or the second subject 406B, the neural network 112 may generate a first output for the re-arrangement of the rig 402. The first output may indicate information to avoid re-arrangement of the rig 402, as the arrangement of the rig 402 (i.e. the arrangement and values associated with various parameters associated with the plurality of image sensors, the plurality of audio capturing devices, and the plurality of light sources) may be ideal (or appropriate) for the generation of one or more 3D models of each of the set of subjects in the first scene. As the re-arrangement of the rig 402 may not be required, the circuitry 202 may be further configured to control at least the first image sensor 408A of the plurality of image sensors to capture one or more images of the first scene. Based on the captured one or more images of the first scene, the circuitry 202 may further generate the one or more 3D models of at least one of the set of subjects. The details about the generation of the one or more 3D models are provided, for example, in FIG. 3 (at 302G).

With reference to FIG. 4B, at time "T2", a second scene may be shot (or captured). The second scene may be captured after capture of the first scene at time "T1". As the second scene have to be shot after the capture of the first scene, the rig 402 may still be arranged in accordance with the first scene (as shown in FIG. 4A). The second scene may include only the first subject 406A (i.e. the actor). Based on an initialization of capture of the second scene, the circuitry 202 may be configured to control at least the first image sensor 408A to capture a second image of the second scene which may include only the first subject 406A. The captured second image may be fed, as a second input, to the neural network 112. In some embodiments, the second input may also include the information about the rig 402. The neural network 112 may determine that the count of the set of subjects is reduced to 'one' from 'two' (during the time "T1") and further recognize that only the 'actor' (i.e. the first subject 406A) may present in the 3D physical space. The neural network 112 may further process the information associated with the current rig (i.e. the rig 402), the determined count, and information about the recognition of the first subject 406A, to further generate a second output (or modify first output) for the re-arrangement of the rig 402.

The circuitry 202 may receive the second output from the neural network 112 for the re-arrangement of the rig 402. Specifically, the received second output may include, but is not limited to, identification information about one or more image sensors that can be removed from the rig 402, identification information about one or more plurality of structures that can be removed from the rig 402, a count of plurality of structures 404 that can be removed from the rig 402, information about one or more plurality of audio capture devices that can be removed from the rig 402, and/or information about one or more light sources that can be removed from the rig 402.

Based on the received second output, the circuitry 202 may select one or more image sensors of the plurality of image sensors based on the received second output. In some embodiments, the circuitry 202 may further select a first set of audio capture devices from the plurality of audio capture devices based on the received first output. In another embodiment, the circuitry 202 may further select a first set of light sources from the plurality of light sources based on the received first output.

The circuitry 202 may control a first set of structures associated with the selected one or more image sensors to re-arrange the rig around the 3D physical space. In another embodiment, the circuitry 202 may control a second set of structures associated with the selected first set of audio capture devices or the selected first set of light sources. The controlled first set of structures (and/or the second set of structures) may be removed from plurality of structures 404 in the rig 402 to re-arrange the rig 402 into a re-arranged rig 414, as shown in FIG. 4B. With reference to FIG. 4A and as depicted in FIG. 4B, a second count of the plurality of structures 404 that form the re-arranged rig 414 may be less than a first count of the plurality of structures 404 that form the rig 402. In other words, the volume or area of the 3D physical space captured by the rig 414 may be reduced, in comparison to the volume area covered by the rig 402 in FIG. 4A. The rig 402 may be re-arranged in such a way that the re-arranged rig 414 may be an ideal or appropriate rig to capture the second scene including only one subject. It may be noted that, the second scene when captured in the ideal rig (i.e. re-arranged rig 414), may generate one or more 3D models with high quality.

In an embodiment, the circuitry 202 may remove the first set of structures (and/or the second set of structures) based on control of the power supply associated with one or more image sensors, and/or one or more processing devices, and/or one or more audio capture devices, and/or one or more light sources positioned on the first set of structures (and/or the second set of structures). The power supply may be controlled by the disclosed electronic device 102. Based on the control of the power supply, the image sensors or other devices on the first set of structures (and/or the second set of structures) may be de-activated, such that the first set of structures seem to be removed from the plurality of structures 404 of the rig 402. In some other embodiments, each of the plurality of structures 404 may be deployed on an unmanned aerial vehicle (UAV shown in FIG. 8). In such case, the electronic device 102 (using the neural network 112) may send one or more commands to the processing device of the first set of structures (i.e. deployed on different UAVs) to be removed from the rig 402 for the re-arrangement. In addition, the electronic device 102 may send one or more commands to other structures in the plurality of structures 404 to change their 3D positions and/or orientation to form a particular shape (such as a dome) of the rearranged rig (such as rig 414 shown in FIG. 4B). Therefore, the disclosed electronic device 102 may be capable to reduce the manual effort required to control the first set of structures (and/or the second set of structures) in the plurality of structures 404 for the re-arrangement of the rig 402 in case of detection of scene changes (i.e. number of subject change from the first scene in FIG. 4A to the second scene in FIG. 4B). Therefore, based on the number/count of the subjects of the scene in the 3D physical space, the electronic device 102 may control the re-arrangement of the rig 402. Thus, the disclosed electronic device 102 provides easy deploy-ability and portability to the volumetric capture based on the real-time analysis of the scene.

In another embodiment, with respect to FIG. 4A, based on the trained neural network 112, the circuitry 202 of the electronic device 102 may recognize that the first subject 406A in the first scene may be an actor (or a lead dancer, or a well-known celebrity). Based on the recognition, the circuitry 202 may further decide (i.e. based on user inputs or preprogrammed) to re-arrange the rig 402 to change the focus of capture towards the first subject 406A from the set of subjects (i.e. multiple subjects) in the first scene. Therefore, based on the decision, the circuitry 202 may select the one or more image sensors or the first set of structures to re-arrange the rig (i.e. rig 414 shown in FIG. 4B) to focus on the first subject 406A as an important subject in the first scene. In an embodiment, the circuitry 202 may be configured to receive the second output or the first output from an operator device associated with an operator of the rig 402. The circuitry 202 may provide the captured first image 304 (shown in FIG. 3) about the first scene to the operator device and further receive the information for the re-arrangement of the rig 402.

In an embodiment, based on the re-arrangement of the rig 402, the circuitry 202 may be configured to control a first set of image sensors (that may or may not include the first image sensor 408A) in the re-arranged rig 414 to capture one or more images of the second scene for the generation of the 3D models of the first subject 406A that is present in the 3D physical space. The details for the generation of the 3D models of the first subject 406A are provided, for example, in FIG. 3 (at 302G).

It may be noted here that the position/orientation/arrangement/shape of plurality of structures 404, the plurality of image sensors positioned on the plurality of structures 404, and the processing devices positioned on the plurality of structures 404 shown in FIGS. 4A and 4B is presented merely as an example. The present disclosure may be also applicable to other positions/orientations/arrangements/shape of plurality of structures 404, the plurality of image sensors positioned on the plurality of structures 404, and the processing devices positioned on the plurality of structures 404, without deviation from the scope of the disclosure.

Figure 5A:
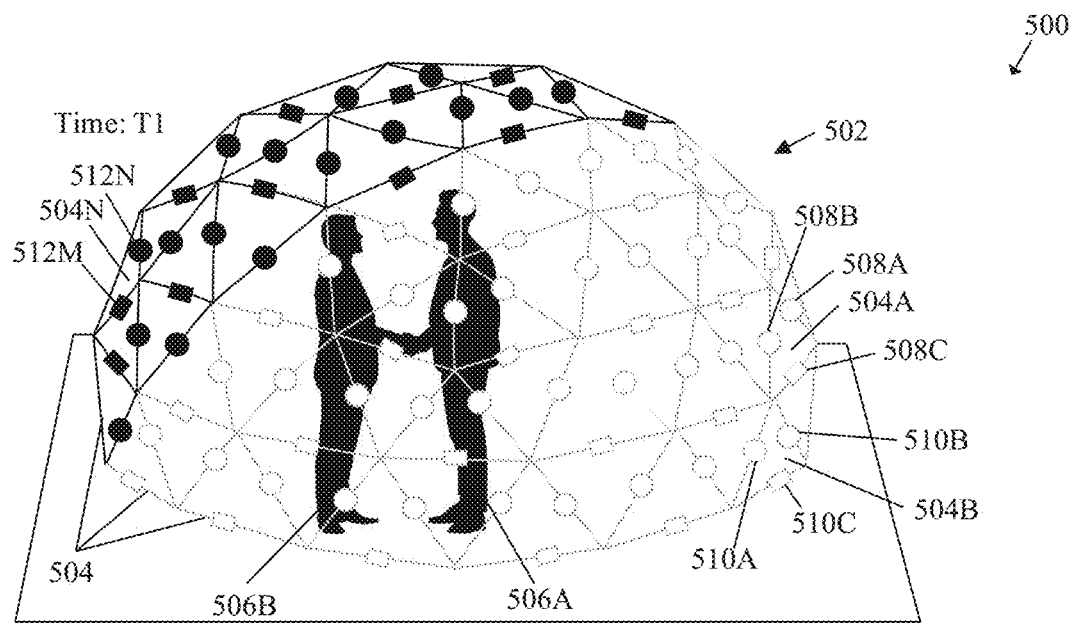
FIGS. 5A and 5B are diagrams that collectively depict an exemplary second scenario for programmable rig control for three-dimensional (3D) reconstruction, in accordance with an embodiment of the disclosure.
Figure 5B:
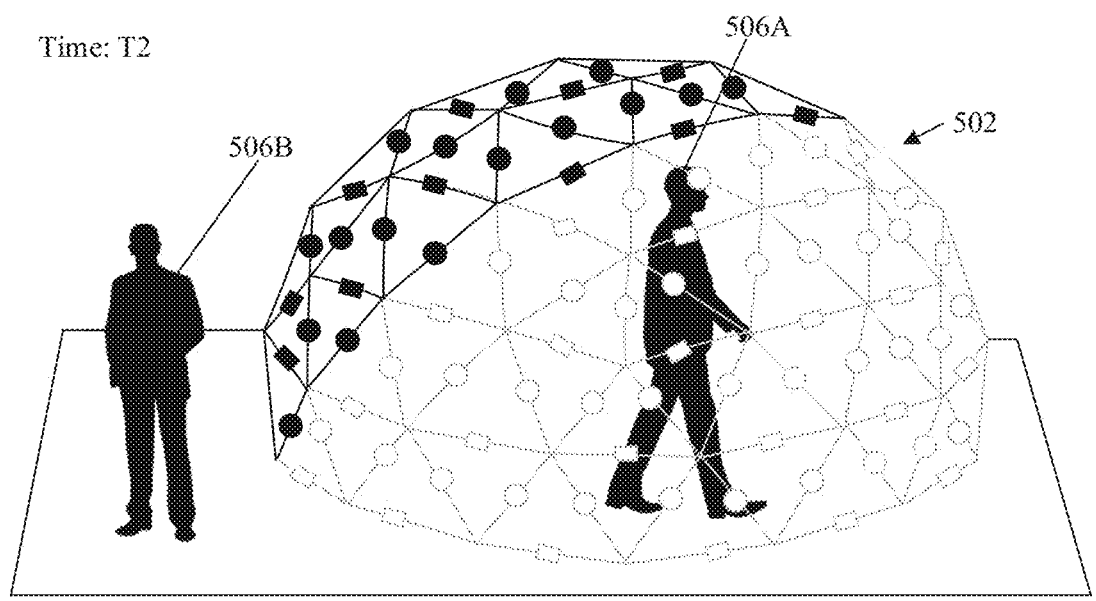

FIGS. 5A and 5B are diagrams that collectively depict an exemplary second scenario for programmable rig control for three-dimensional (3D) reconstruction, in accordance with an embodiment of the disclosure. FIGS. 5A and 5B are explained in conjunction with elements from FIGS. 1, 2, 3, 4A, and 4B. With reference to FIGS. 5A and 5B, there is shown an exemplary scenario 500 that includes a rig 502 composed of a plurality of structures 504 that may cover (and/or capture) a 3D physical space. FIG. 5A may represent a scenario at time "T1". With reference to FIG. 5A, there is further shown a set of subjects in the 3D physical space around which the rig 502 may be formed. The set of subjects may include, but is not limited, a first subject 506A, and a second subject 506B. FIG. 5B may represent a scenario at time "T2" (after time "T1").

The plurality of structures 504 may include the first structure 504A, the second structure 504B, and an Nth structure 504N. Each of the plurality of structures 504 may be triangular in shape and may include at least one image sensor and at least one processing device. In an embodiment, the processing device on one of the plurality of structures 504 may act as the electronic device 102. As shown, the first structure 504A may include a first image sensor 508A, a second image sensor 508B, and a first processing device 508C. The second structure 504B may include a third image sensor 510A, a fourth image sensor 510B, and a second processing device 510C. Similarly, the Nth structure 504N may include an Nth processing device 512M, and an Nth image sensor 512N.

With reference to FIG. 5A, at time "T1", a first scene may be captured by the rig 502. The first scene, for example, may be a movie scene (or a business meeting scene, or a talk show scene), which may include the first subject 506A and the second subject 506B. The first subject 506A may be an actor (or a high-profile celebrity) and the second subject 506B may be a co-actor or other person associated with the first subject 506A. For example, in the first scene shown in FIG. 5A, the first subject 506A may be in conversation and shaking hands with the second subject 506B.

At the time of start of the first scene, the circuitry 202 may be configured to control at least an image sensor (for example the first image sensor 508A or other image sensor with field of view towards the set of subjects) to capture the first image of the first scene. As described, the first scene may include the set of subjects in the 3D physical space around which the rig 502 may be formed. The circuitry 202 may further feed the captured first image, as a first input, to the neural network 112. In some embodiments, the first input may further include information about the rig 502 as descried, for example, in FIGS. 3 and 4A.

The neural network 112 may receive the captured first image and/or the information about the existing rig 502 and may further configured to determine a location of each of the set of subjects in the 3D physical space. In some embodiments, the neural network 112 may also perform facial recognition of each of the set of subjects in the first scene along with the determination of the location of the set of subjects. For example, the neural network 112 may determine a first location of each of the first subject 506A and the second subject 506B, and further recognize the first subject 506A as the 'actor' (or any high-profile celebrity or an important person of the first scene) and the second subject 506B as the 'co-actor' or other person of the first scene. The neural network 112 or circuitry 202 may store the determined first location of the first subject 506A and the second subject 506B in the memory 204 of the electronic device 102. The neural network 112 may be able to determine the location of each of the set of subjects, and recognize the first subject 506A and the second subject 506B, because the neural network 112 may be pre-trained or programmed on the plurality of parameters that may include the location of at least one subject of the set of subjects in the 3D physical space, and the recognition of at least one subject of the set of subjects.

Based on the fed information about the rig 502, the determined first location of each of the set of subjects, and the recognition of the first subject 506A (and/or the second subject 506B), the neural network 112 may generate a first output for the re-arrangement of the rig 502. The first output may indicate information to avoid re-arrangement of the rig 502 as the arrangement of the rig 502 (i.e. the arrangement and values associated with various parameters of the plurality of image sensors, the plurality of audio capturing devices, and the plurality of light sources) may be ideal (or appropriate) for the generation of one or more 3D models of each of the set of subjects in the first scene. As the re-arrangement of the rig 502 may not be required, the circuitry 202 may be further configured to control at least the first image sensor 508A (or other image sensors) of the plurality of image sensors to capture one or more images of the first scene. Based on the captured one or more images of the first scene, the circuitry 202 may further generate the one or more 3D models of at least one of the set of subjects. The details about the generation of the one or more 3D models are provided, for example, in FIG. 3 (at 302G).

At time "T2", the first subject 406A may start moving away from the second subject 506B, as shown in FIG. 5B. The circuitry 202 may be configured to control at least the first image sensor 508A to capture a second image of the 3D physical space which may include the first subject 506A and the second subject 506B. The captured second image may be fed, as a second input, to the neural network 112. The neural network 112 may determine a second location of the first subject 506A and the second subject 506B. The neural network 112 may further detect a movement of the first subject 506 based on the determined first position at time "T1" (in FIG. 4A) and the determined second position at time "T2" (in FIG. 4B). Based on the movement of the first subject 506A that may be detected as the actor (or an important person of the scene), the neural network 112 may generate a second output (or modify the first output) for the re-arrangement of the rig 502 to capture the first subject 506A with detailed focus.

The circuitry 202 may receive the second output from the neural network 112 for the re-arrangement of the rig 502. Specifically, the received second output may include, but is not limited to, first information about a distance of a movement of the rig 502, second information about a direction of the movement of the rig 502, or modified 3D positions and/or orientations of the plurality of structures 504 of the rig 502. Based on the received second output, the circuitry 202 may select the plurality of image sensors based on the received second output (or modified first output) as described, for example, in FIGS. 3 and 4A-4B. In some embodiments, the circuitry 202 may further select the plurality of audio capture devices based on the received second output. In another embodiment, the circuitry 202 may further select the plurality of light sources based on the received second output.

The circuitry 202 may control a first set of structures associated with the selected one or more image sensors to re-arrange the rig 502 around the 3D physical space as described, for example, in FIGS. 3A and 4B. In such an embodiment, the first control of structures may correspond to the plurality of structures 504. The controlled first set of structures (and/or the second set of structures) may be moved to the distance specified in the first information of the received second output and in the direction specified in the second information of the received second output, as shown in FIG. 5B. The circuitry 202 may provide one or more commands to the first set of structures (and/or or the second set of structures) for the movement based on information about the distance, direction, 3D positions, and/or orientations provided by the neural network 112. Therefore, based on the real-time change in position or movement of a subject in a scene within the 3D physical space, the disclosed electronic device 102 (using the pre-trained or pre-programmed neural network 112) may dynamically control the movement of the rig 502 or re-deploy the rig 502, without much manual effort and time required.

After the movement of the rig 502 (as shown in FIG. 5B), the circuitry 202 may be configured to control at least the first image sensor 508A (or other image sensor) to capture one or more images of the first subject 506A for the generation of the 3D models of the first subject 506A that is present in the 3D physical space. The details for the generation of the 3D models of the first subject 506A are provided, for example, in FIG. 3 (at 302G).

Figure 6A:
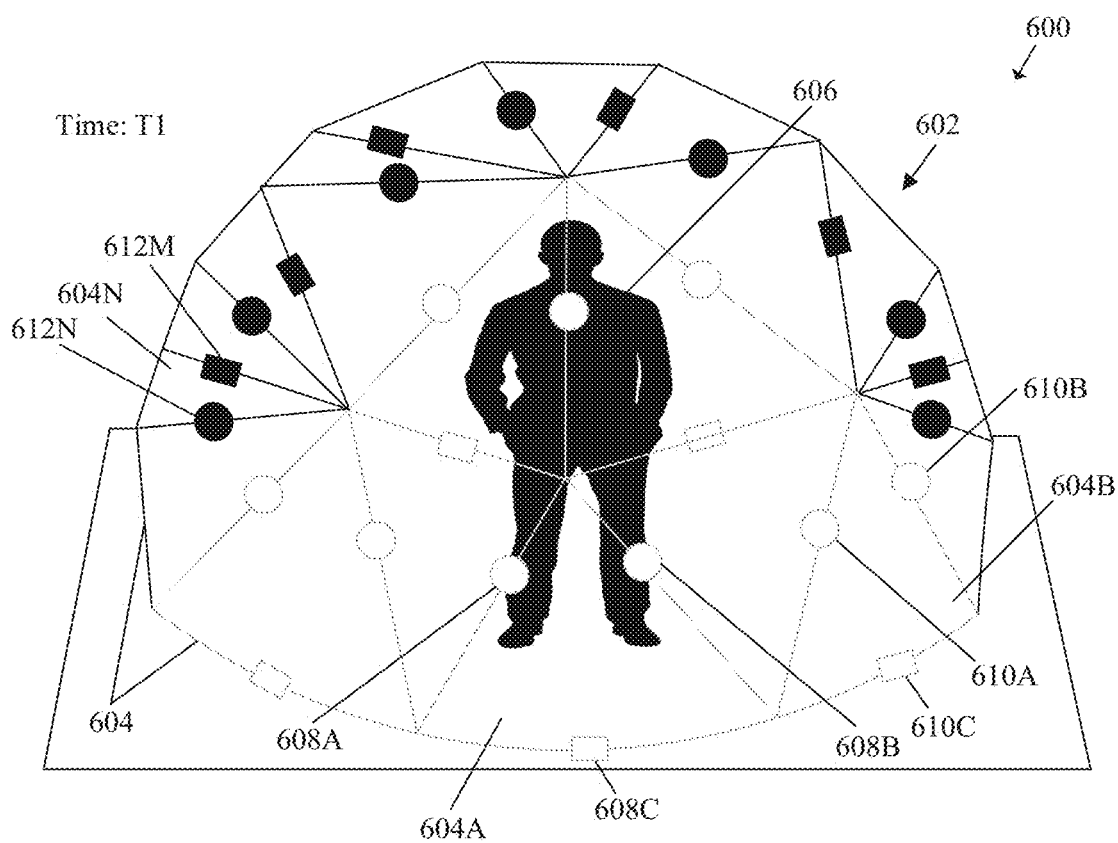
FIGS. 6A and 6B are diagrams that collectively depict an exemplary third scenario for programmable rig control for three-dimensional (3D) reconstruction, in accordance with an embodiment of the disclosure.
Figure 6B:
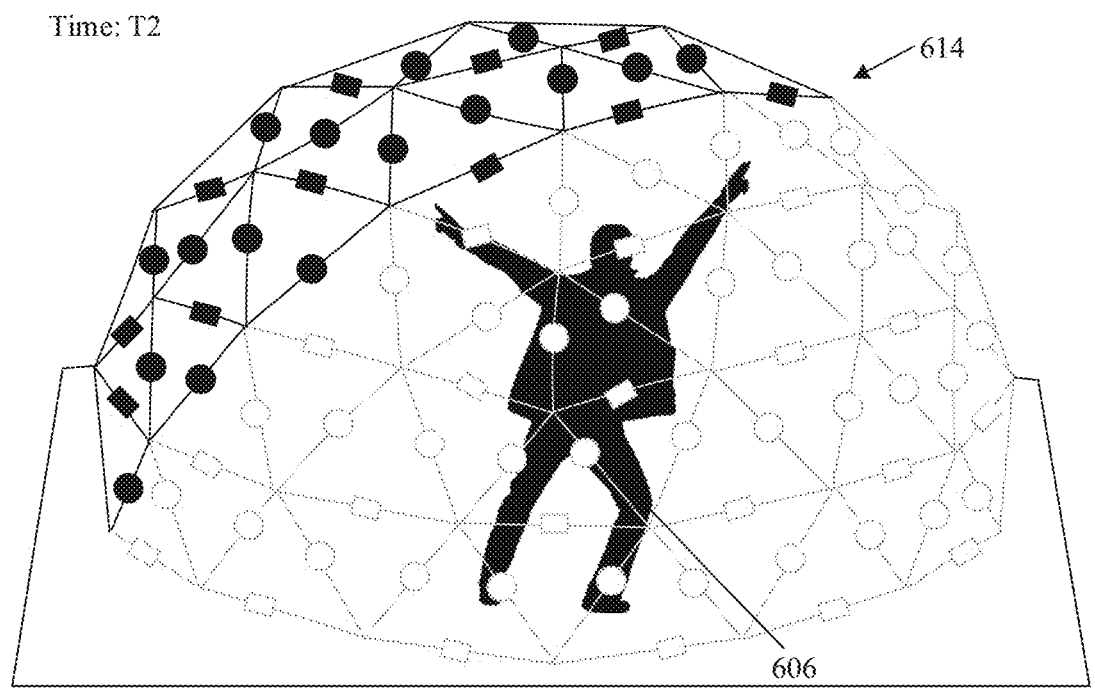

FIGS. 6A and 6B are diagrams that collectively depict an exemplary third scenario for programmable rig control for three-dimensional (3D) reconstruction, in accordance with an embodiment of the disclosure. FIGS. 6A and 6B are explained in conjunction with elements from FIGS. 1, 2, 3, 4A, 4B, 5A, and 5B. With reference to FIGS. 6A and 6B, there is shown an exemplary scenario 600 that includes a rig 602 composed of a plurality of structures 604 that may cover (and/or capture) a 3D physical space. FIG. 6A may represent a scenario at time "T1". With reference to FIG. 6A, there is further shown first subject 606 in the 3D physical space around which the rig 602 is formed by the plurality of structures 604. FIG. 6B may represent a scenario at time "T2" (after time "T1").

The plurality of structures 604 may include, but is not limited to, the first structure 604A, the second structure 604B, and an Nth structure 604N. Each of the plurality of structures 604 may be triangular in shape and may include at least one image sensor and at least one processing device as described in FIGS. 1, 4A and 5A. As shown in 6A, the first structure 604A may include a first image sensor 608A, a second image sensor 608B, and a first processing device 608C. The second structure 604B may include a third image sensor 610A, a fourth image sensor 610B, and a second processing device 610C. Similarly, the Nth structure 604N may include an Nth processing device 612M, and an Nth image sensor 612N.

With reference to FIG. 6A, at time "T1", a first scene may be captured by the rig 602. The first scene may be, for example, a dance performance, a speech event, or a movie scene which may include the first subject 606A. The first subject 606 may be in a standing pose in the 3D physical space, as shown in FIG. 6A. In an embodiment, the circuitry 202 may be configured to control at least the first image sensor 608A (or any other image sensor) to capture the first image of the first subject 606 in the first scene. The circuitry 202 may further feed the captured first image, as a first input, to the neural network 112. In some embodiments, the first input may further include information about the existing rig 602

The neural network 112 may receive the captured first image and may be trained to detect a first pose of the first subject 606 (i.e. physically present in the first scene). The neural network 112 may detect the first pose of the first subject 606 as 'a standing pose', as shown in FIG. 6A. The neural network 112 may be able to detect the first pose of the first subject 606, as the neural network 112 may be pre-trained on the plurality of parameters that may include a pose (an action) detection as described, for example, in FIG. 3. Based on the fed information about the rig 602 and the detected first pose of the first subject 606, the neural network 112 may generate a first output for the re-arrangement of the rig 602. As per FIG. 6A, based on the detected pose and the information about the existing rig 602, the first output may indicate to avoid any re-arrangement in the rig 602 as the arrangement of the rig 602 may be ideal or appropriate for the generation of one or more 3D models of the first subject 606 in the first scene.

With reference to FIG. 6B, at time "T2", the circuitry 202 may be configured to control at least the first image sensor 608A to capture a second image of the first scene or a second scene which may include the first subject 606. The captured second image may be fed, as a second input, to the neural network 112. In some embodiments, the second input may also include information about the rig 602. The neural network 112 may further detect a second pose of the first subject 606 based on the input second input. The neural network 112 may detect the second pose of the first subject as 'a dance pose' or an 'excitement pose'. The neural network 112 may further process the information associated with the current rig (i.e. the rig 602) and further generate a second output (or modified first output) for the re-arrangement of the rig 602, based on the processed information and detected change in pose (i.e. from the first pose in FIG. 6A to the second pose in FIG. 6B).

The circuitry 202 may further receive the second output from the neural network 112 for the re-arrangement of the rig 602, for example, to increase the volume of the rig 602 due to the detected second pose. The neural network 112 may be pre-trained to provide the output (i.e. for the expansion of the rig 602) for a predefined pose (for example as a pose shown in FIG. 6B). Specifically, the received second output may include, but is not limited to, identification information about one or more image sensors that may be required to be added in the rig 602, identification information about one or more plurality of structures that may be required to be added in the rig 602, a count of plurality of structures 604 that may be required to be added in the rig 602, information about one or more plurality of audio capture devices that may be required to be added in the rig 602, and/or information about one or more light sources that may be required to be added the rig 602.

Based on the received second output, the circuitry 202 may select one or more image sensors based on the received second output (i.e. or modified first output). In some embodiments, the circuitry 202 may further select a first set of audio capture devices based on the received second output. In another embodiment, the circuitry 202 may further select a first set of light sources based on the received second output.

The circuitry 202 may further control a first set of structures associated with the selected one or more image sensors to re-arrange the rig 602 around the 3D physical space. In another embodiment, the circuitry 202 may control a second set of structures associated with the selected first set of audio capture devices or the selected first set of light sources. The controlled first set of structures (and/or the second set of structures) may be added to the plurality of structures 604 in the rig 602 to re-arrange the rig 602 into a re-arranged rig 614, as shown in FIG. 6B. The first set of structures (and/or the second set of structures) may be added from the equipment inventory 306 as described, for example, in FIG. 3 (at 302D and 302E). With reference to FIG. 6A and FIG. 6B, a second count of the plurality of structures 604 that form the re-arranged rig 614 may be greater than a first count of the plurality of structures 604 that form the rig 602 (in FIG. 6A). The rig 602 may be re-arranged in such a way that the re-arranged rig 614 may be an appropriate rig for the capture of the second scene that includes the first subject 606 in the 'dance pose'. The circuitry 202 may provide one or more commands (i.e. including 3D positions orientations, and/or imaging parameters) to the plurality of structures 604 and to the first set of structures (i.e. to be added from the equipment inventory 306) to form the re-arranged rig 614 with increased volume of the volumetric capture of the 3D physical space. It may be noted that the second scene when captured in the re-arranged and expanded rig 614, may generate one or more 3D models of the first subject 606 with higher quality, in comparison to the one or more 3D models generated for the first subject 606 captured in the rig 602 (i.e. different from the re-arranged rig 614. Therefore, based on the real-time change in poses of a subject in a scene within the 3D physical space, the disclosed electronic device 102 (using the pre-trained or pre-programmed neural network 112) may dynamically control the volume or arrangement of the rig 602 or re-deploy the rig 602, without much manual effort and time required.

It may be noted that the first scene and the second scene (and mentioned poses) shown in FIGS. 6A and 6B are presented merely as an example. The present disclosure may be also applicable to other types of shots, scenes, or poses, without a deviation from the scope of the disclosure.

Figure 7A:
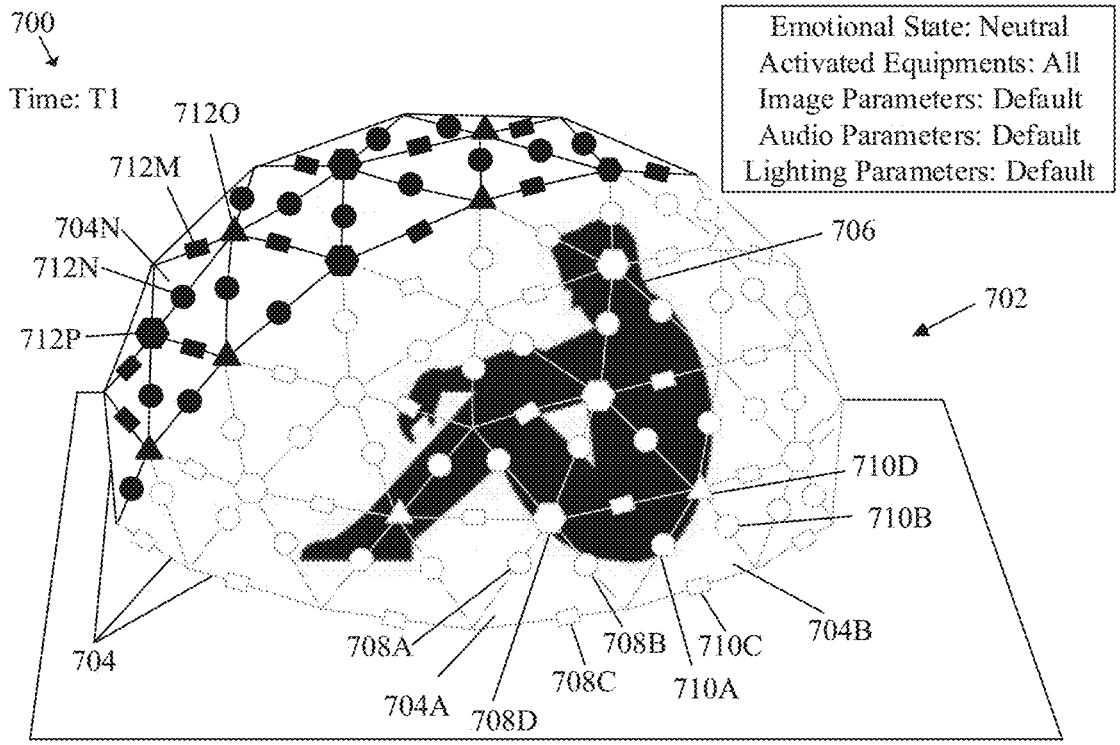
FIGS. 7A and 7B are diagrams that collectively depict an exemplary fourth scenario for programmable rig control for three-dimensional (3D) reconstruction, in accordance with an embodiment of the disclosure.
Figure 7B:
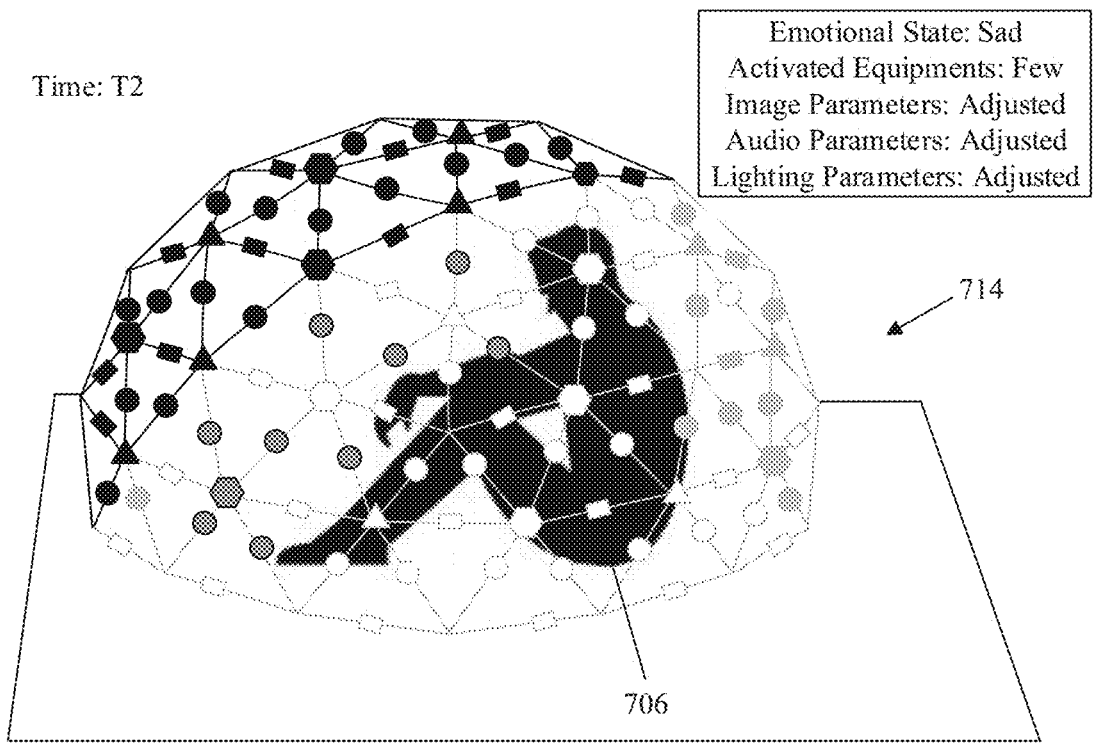

FIGS. 7A and 7B are diagrams that collectively depict an exemplary fourth scenario for programmable rig control for three-dimensional (3D) reconstruction, in accordance with an embodiment of the disclosure. FIGS. 7A and 7B are explained in conjunction with elements from FIGS. 1, 2, 3, 4A, 4B, 5A, 5B, 6A, and 6B. With reference to FIGS. 7A and 7B, there is shown an exemplary scenario 700 that includes a rig 702 composed of a plurality of structures 704 that may cover (and/or capture) a 3D physical space. FIG. 7A may represent a scenario at time "T1". With reference to FIG. 7A, there is further shown a first subject 706 in the 3D physical space around which the rig 702 is formed by the plurality of structures 704. FIG. 7B may represent a scenario at time "T2" (after time "T1").

The plurality of structures 704 may include the first structure 704A, the second structure 704B, and an Nth structure 704N. Each of the plurality of structures 704 may be triangular in shape and may include at least one image sensor and at least one processing device. As shown, the first structure 704A may include a first image sensor 708A, a second image sensor 708B, a first processing device 708C, and a first light source 708D. The second structure 704B may include a third image sensor 710A, a fourth image sensor 710B, a second processing device 710C, and a first audio capture device 710D. Similarly, the Nth structure 704N may include an Nth processing device 712M, an Nth image sensor 712N, an Nth audio capture device 712O, and an Nth light source 712P. Therefore, the rig 702 may comprise the plurality of image sensors (represented by circles), a plurality of processing devices (represented by rectangles), a plurality of light sources (represented by hexagons), and a plurality of audio capture devices (represented by triangles) positioned on the plurality of structures 704 that may form the rig 702 around the 3D physical space.

Each of the plurality of audio capture devices may include suitable logic, circuitry, and/or interfaces that may be configured to capture an audio signal from the first subject 706. Each of the plurality of audio capture devices may be further configured to convert the captured audio signal into an electrical signal for the circuitry 202. Examples of each of the plurality of audio capture devices may include, but are not limited to, a recorder, an electret microphone, a dynamic microphone, a carbon microphone, a piezoelectric microphone, a fiber microphone, a (micro-electro-mechanical-systems) MEMS microphone, or other microphones known in the art.

Each of the plurality of light sources may include suitable logic, circuitry, and/or interfaces that may be configured to emit light or visible electromagnetic radiations of a particular frequency ranging between 390-700 nm. Each of the plurality of light sources may be an artificial light source. The artificial light source may be further classified into, but are not limited to, an incandescent source, a luminescent source, and a gas discharge source. Examples of artificial light sources may include, but are not limited to, a fluorescent tube light, an electric bulb, a neon lamp, a sodium lamp, a candle, an incandescent lamp or other light sources known in the art.

With reference to FIG. 7A, at time "T1", a first scene may be captured by the rig 702. The first scene may include the first subject 706. For example, the emotional state of a face of the first subject 706 may be "neutral". The circuitry 202 may be configured to control at least an image sensor (for example the first image sensor 708A) to capture the first image of the first scene shown in FIG. 7A. As described, the first scene may include the first subject 706 in the 3D physical space around which the rig 702 may be formed. The circuitry 202 may further feed the captured first image, as a first input, to the neural network 112. In some embodiments, the first input may further include information about the rig 702.

The neural network 112 may receive the captured first image and further detect a first emotional state of the first subject 706 in the captured first image. The neural network 112 may further determine the first emotional state of the face of the first subject 706, for example, as 'a neutral emotional state'. The neural network 112 may be able to determine the first emotional state of the face of the first subject 706, as the neural network 112 may be pre-trained on a task to determine an emotional state, as the plurality of parameters as described, for example, in FIG. 3.

Based on the fed information about the rig 702 and the determined first emotional state of the face of the first subject 706, the neural network 112 may generate a first output for the rig 702. The first output may indicate values associated with various parameters of the plurality of image sensors, the plurality of audio capturing devices, and/or the plurality of light sources for the generation of one or more 3D models of the first subject 706 captured in the first scene. By way of an example and not limitation, a first set of default values may be set for the first set of imaging parameters associated with one or more of the plurality of image sensors. A second set of default values may be set for the first set of audio parameters associated with one or more of the plurality of audio capture devices. Similarly, a third set of default values may be set for the first set of lighting parameters associated with one or more of the plurality of light sources. As shown, in FIG. 7A, the first set of default values, the second set of default values, and the third set of default values may be 'default' based on which the corresponding image sensors, audio capture devices, and the light sources may be controlled to capture the first scene (including the first subject 706 with neural emotional state). As another example, the circuitry 202 may control to activate (i.e. power-on) all the equipments (i.e. image sensors, audio capture devices, and the light sources) while the capture of the first subject 706 with neural emotional state. The neural network 112 may be pre-trained to output the default values (i.e. stored in the memory 204) for the imaging parameters, the audio parameters and the lighting parameters for a predefined emotional state (such as neutral).

In an embodiment, the circuitry 202 may be further configured to control at least the first image sensor 708A of the plurality of image sensors to capture one or more images of the first scene. Based on the captured one or more images of the first scene, the circuitry 202 may further generate the one or more 3D models of the first subject 706. The details about the generation of the one or more 3D models are provided, for example, in FIG. 3 (at 302G).

With reference to FIG. 7B, at time "T2", a second scene may be required to be shot (or captured). The second scene may be captured after the capture of the first scene at time "T1". The second scene may include the first subject 706. For example, the emotional state of the face of the first subject 706 in FIG. 7B, may be "sad" instead of "neural" as shown the first scene in FIG. 7A. The circuitry 202 may be configured to control at least the first image sensor 708A to capture a second image of the second scene which may include the first subject 706 with emotional state as "sad". The captured second image may be fed, as a second input, to the neural network 112. In some embodiments, the second input may also include information about the existing rig

702. The pre-trained neural network 112 may determine a second emotional state (as "sad") of the face of the first subject 706 based on the received second input and further generate a second output (or modified first output) for the re-arrangement of the rig 702.

The circuitry 202 may receive the second output from the neural network 112 for the re-arrangement of the rig 602. Specifically, the received second output may include, but is not limited to, a first set of values for the first set of imaging parameters associated with each of a first set of image sensors (represented by grey colored circles with black outline) and a second set of image sensors (represented by grey colored circles) whose power supply can be turned off, a first set of values for the first set of lighting parameters associated with each of a first set of light sources (represented by grey colored hexagons with black outline) and a second set of light sources (represented by grey colored hexagons) whose power supply can be turned off, and a first set of values for the first set of audio parameters associated with each of a first set of audio capture devices (represented by grey colored triangles with black outline) and a second set of audio capture devices (represented by grey colored triangles) whose power supply can be turned off.

The first set of imaging parameters may include at least one of a focus parameter, a field-of-view (FoV) parameter, a zoom parameter, an f-stop parameter, an exposure parameter, a shutter speed parameter, an aperture parameter, a gain parameter, a backlight parameter, a brightness parameter, a contrast parameter, a white balance parameter, a sharpness parameter, a ISO sensitivity parameter, a noise reduction parameter, a demosaic parameter, a denoise parameter, a color parameter, a high dynamic range (HDR) parameter, a rotation (a tilt or an orientation) parameter, or a deblur parameter. The first set of audio parameters may comprise at least one of a loudness parameter, a pitch parameter, a tone parameter, a rate-of-speech parameter, a voice quality parameter, a phonetic parameter, an intonation parameter, an intensity of overtones, a voice modulation parameter, a pronunciation parameter, a prosody parameter, a timbre parameter, or one or more psychoacoustic parameters. The first set of lighting parameters may comprise at least one of a brightness parameter, a contrast parameter, a hue parameter, a tint parameter, a shade parameter, a tone parameter, a color temperature parameter, or a saturation parameter.

Based on the received second output, the circuitry 202 may be configured to re-arrange the rig 702. For the re-arrangement of the rig 702 to the re-arranged rig 714, the circuitry 202 may select the first set of image sensors and adjust the first set of imaging parameters according to the first set of values for the first set of imaging parameters. The circuitry 202 may further select the second set of image sensors and turn off the power supply for each of the second set of image sensors. The circuitry 202 may select the first set of light sources and adjust the first set of lighting parameters according to the first set of values for the first set of lighting parameters. The circuitry 202 may further select the second set of light sources and turn off the power supply for each of the second set of light sources. The circuitry 202 may further select the first set of audio capture devices and adjust the first set of audio parameters according to the first set of values for the first set of audio parameters. The circuitry 202 may further select the second set of audio capture devices and turn off the power supply for each of the second set of audio capture devices. As shown in FIG. 7B, the circuitry 202 (using the pre-trained neural network 112) may activate few equipments (image sensors, audio capture devices, and/or light sources) and adjust imaging/audio/lighting parameters of the corresponding device, based on the detected change in the emotional state from "neural" to "sad".

The rig 702 may be re-arranged (or adjusted) in such a way that the re-arranged rig 714 may be an appropriate rig for the capture of the second scene that includes the first subject 706 in 'sad' emotional state. It may be noted that, the second scene when captured in the re-arranged rig 714, may generate one or more 3D models with high quality, in comparison to the one or more 3D models generated when the second scene is captured in the rig 702 (i.e. different than the adjusted rig 714). Therefore, based on the real-time change in emotional states of a subject in a scene within the 3D physical space, the disclosed electronic device 102 (using the pre-trained or pre-programmed neural network 112) may dynamically adjust the parameters (i.e. for example, but not limited to, imaging, audio, or lighting) of the rig 702, without much manual effort and time required.

It may be noted that exemplary scenarios (related to count of subjects, recognition of subjects, movement of subjects, pose (action) of subjects, and emotional state of subjects) in FIGS. 4A-4B, 5A-5B, 6A-6B, and 7A-7B are presented merely as examples. The disclosed electronic device 102 (using trained neural network 112) may analyze different aspects (for example, but not limited to, type, genre, demographic, profile, lighting conditions, depth, event, time, or history of re-arrangement) of the captured scene/subject, for efficient re-arrangement of the rig for enhanced volumetric studio, without a deviation from the scope the disclosure.

Figure 8:
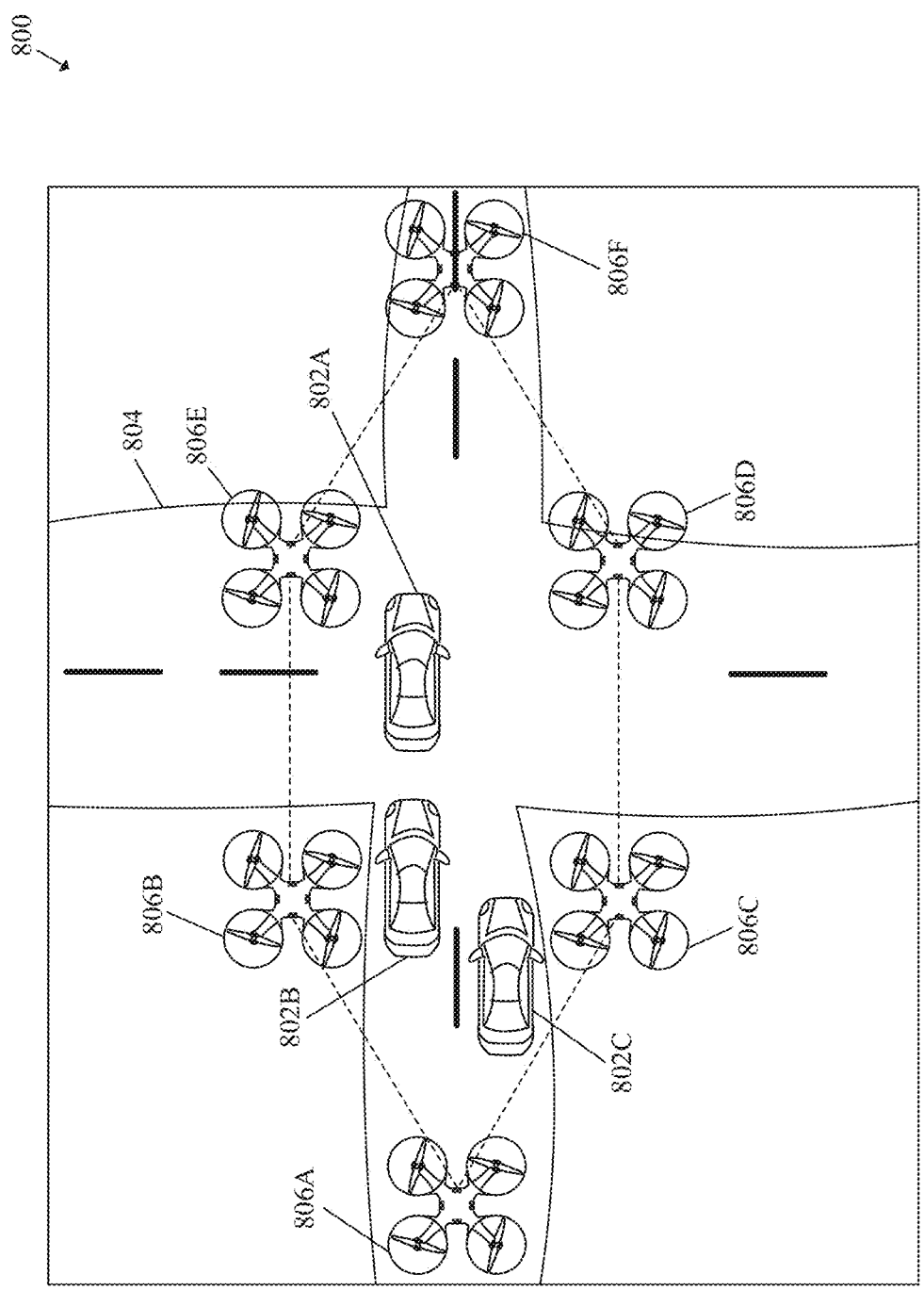
FIG. 8 is a diagram that illustrates an exemplary scenario for programmable virtual rig for three-dimensional (3D) reconstruction, in accordance with an embodiment of the disclosure.

FIG. 8 is a diagram that illustrates an exemplary scenario for programmable virtual rig for three-dimensional (3D) reconstruction, in accordance with an embodiment of the disclosure. FIG. 8 is explained in conjunction with elements from FIGS. 1, 2, 3, 4A, 4B, 5A, 5B, 6A, 6B, 7A, and 7B. With reference to FIG. 8, there is shown an exemplary scenario 800 of a sports event (such as a car racing event). There is further shown a plurality of vehicles that may include a first vehicle 802A, a second vehicle 802B, and a third vehicle 802C moving on a road 804 (i.e. a racing track). With reference to FIG. 8, there is further shown a plurality of unmanned aerial vehicles (UAVs) which may include, but is not limited to, a first UAV 806A, a second UAV 806B, a third UAV 806C, a fourth UAV 806D, a fifth UAV 806E, and a sixth UAV 806F.

The plurality of UAVs may form a virtual rig over a 3D physical space that may include the plurality of vehicles and the road 804. In such an implementation, each of the plurality of structures of the virtual rig may be mounted on each of the unmanned aerial vehicles (UAV). By way of example and not limitation, the first structure may be mounted on the first UAV 806A. Similarly, the second structure may be mounted on the second UAV 806B. In an embodiment, each of the plurality of UAV may include at least one image sensor (not shown) and at least one processing device (not shown), for example, as the electronic device 102. In another embodiment, in addition to at least one image sensor and at least one processing device, the UAV may also include at least one light source (not shown) and/or at least one audio capture device (not shown). By way of example, the first UAV 806A may include a first image senor, a first processing device, a first light source and a first audio capture device.

The first processing device of the first UAV 806A (or a ground station controller, not shown) may control the first image sensor positioned on the plurality of structures mounted on the plurality of UAVs. The plurality of structures mounted on the plurality of UAVs may form the virtual rig around the 3D physical space where the car racing event may be happening. The first image sensor may be controlled to capture a first image of a first scene of the car racing event which may include the plurality of vehicles in the 3D physical space. The first processing device may further feed the captured first image to a neural network stored in a memory of the first processing device of the first UAV 806A.

The first processing device may receive the first output from the neural network based on the fed first input. The received first output may include information about a re-arrangement of the virtual rig. Based on the received first output, the first processing device may select one or more image sensors of a plurality of image sensors positioned on the plurality of structures. The first processing device (or the ground station controller) may further control a first set of UAVs associated with the selected one or more image sensors to re-arrange the virtual rig around the 3D physical space.

As described above, the re-arrangement of the virtual rig may correspond to addition of at least one UAV in the plurality of UAVs or removal of at least one UAV from the plurality of UAVs. In another embodiment, the re-arrangement of the virtual rig may correspond to change in at least one imaging parameter associated with the at least one of the plurality of image sensors, at least one lighting parameter associated with the plurality of light sources, and at least one audio parameter associated with the plurality of audio capture devices mounted of the plurality of UAVs. In another embodiment, the re-arrangement of the virtual rig may correspond to a movement of the plurality of UAVs in different directions, for different distances, and different 3D positions. The first processing device of the first UAV 806A (or the ground station controller) may further control a first set of image sensors in the re-arranged virtual rig to capture one or more images for generation of one or more three-dimensional (3D) models of different vehicles in the 3D physical space. It may be noted that the plurality of UAVs that may form the virtual rig in a hexagonal shape is presented merely as an example. The present disclosure may be also applicable to other virtual rig in different polygon shapes, without deviation from the scope of the disclosure.

Figure 9:
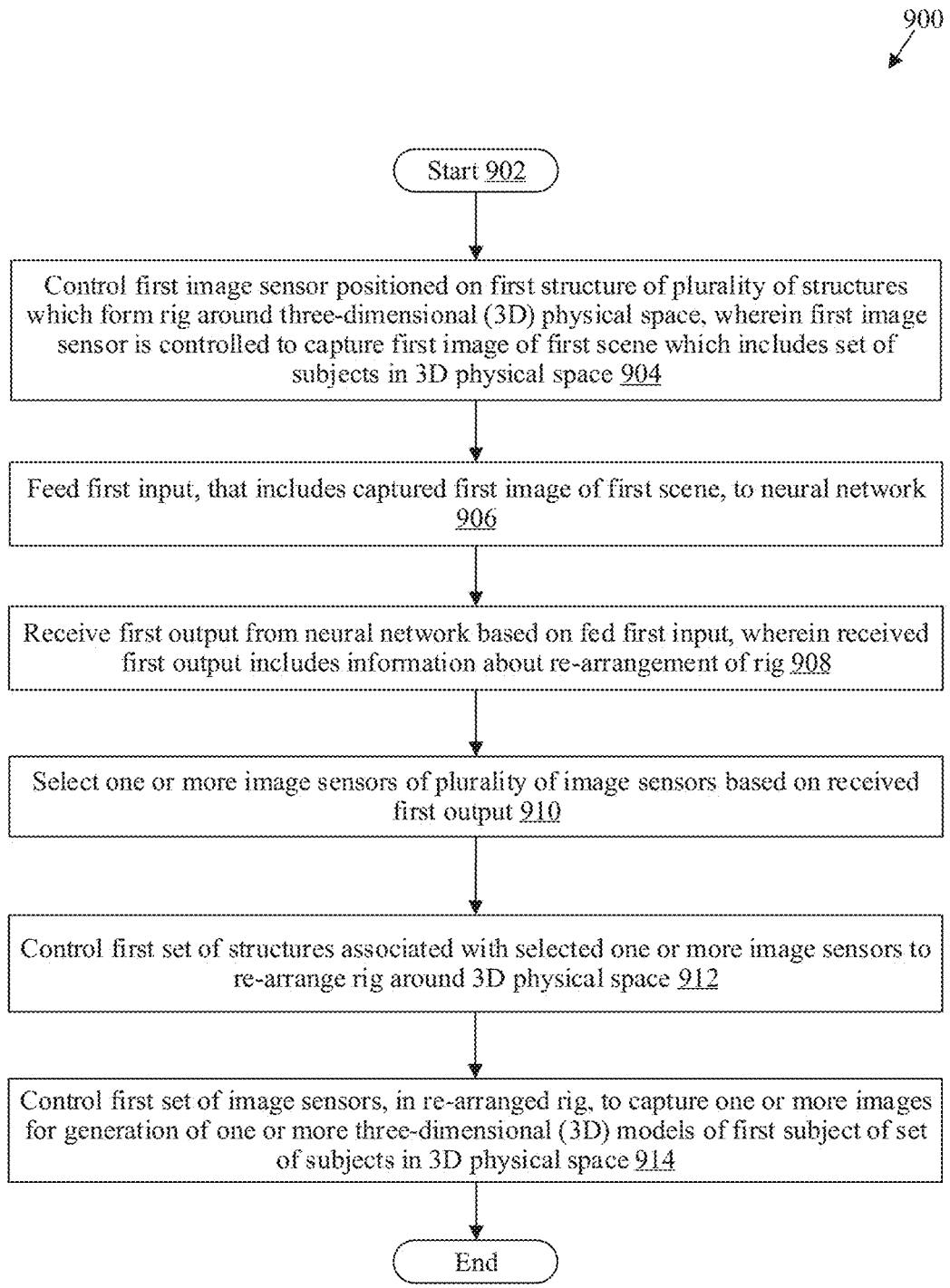
FIG. 9 is a flowchart that illustrates an exemplary method for programmable rig control for three-dimensional (3D) reconstruction, in accordance with an embodiment of the disclosure.

FIG. 9 is a flowchart that illustrates an exemplary method for programmable rig control for three-dimensional (3d) reconstruction, in accordance with an embodiment of the disclosure. FIG. 9 is explained in conjunction with elements from FIGS. 1, 2, 3, 4A, 4B, 5A, 5B, 6A, 6B, 7A, 7B, and 8. With reference to FIG. 9, there is shown a flowchart 900. The operations of the exemplary method may be executed by any computing system, for example, by the electronic device 102 of FIG. 1 or the circuitry 202 of FIG. 2. The operations of the flowchart 900 may start at 902 and may proceed to 904.

At 904, the first image sensor 108A positioned on the first structure 106A of the plurality of structures 106 (i.e. which form the rig 104 around the 3D physical space) may be controlled. The first image sensor 108A may controlled to capture the first image 304 of the first scene which includes the set of subjects in the 3D physical space. In at least one embodiment, the circuitry 202 may control the first image sensor 108A positioned on the first structure 106A of the plurality of structures 106 which form the rig 104 around the 3D physical space, wherein the first image sensor 108A is controlled to capture the first image 304 of the first scene which includes the set of subjects in the 3D physical space as described, for example, in FIGS. 3 (at 302A), 4A-4B, 5A-5B, 6A-6B, and 7A-7B.

At 906, a first input may be fed to the neural network 112. The first input may include the captured first image 304 of the first scene. In at least one embodiment, the circuitry 202 may feed the first input that includes the captured first image 304 of the first scene to the neural network 112 as described, for example, in FIGS. 3 (at 302B), 4A-4B, 5A-5B, 6A-6B, and 7A-7B.

At 908, a first output from the neural network 112 may be received. The first output may be received based on the fed first input. The received first output may include information about a re-arrangement of the rig 104. In at least one embodiment, the circuitry 202 may receive the first output from the neural network 112 based on the fed first input, wherein the received first output includes the information about the re-arrangement of the rig 104 as described, for example, in FIGS. 3 (at 302C), 4A-4B, 5A-5B, 6A-6B, and 7A-7B.

At 910, the one or more image sensors of the plurality of image sensors 108 may be selected based on the received first output. In at least one embodiment, the circuitry 202 may select the one or more image sensors of the plurality of image sensors 108 based on the received first output as described, for example, in FIGS. 3, 4A-4B, 5A-5B, 6A-6B, and 7A-7B.

At 912, the first set of structures associated with the selected one or more image sensors may be controlled. The first set of structures may be controlled to re-arrange the rig 104 around the 3D physical space. In at least one embodiment, the circuitry 202 may control the first set of structures associated with the selected one or more image sensors to re-arrange the rig 104 around the 3D physical space, as described, for example, in FIGS. 3 (at 302D and 302E), 4A-4B, 5A-5B, 6A-6B, and 7A-7B.

At 914, a first set of image sensors in the re-arranged rig 308 may be controlled. The first set of image sensors in the re-arranged rig 308 may be controlled to capture the one or more images for generation of the one or more three-dimensional (3D) models of the first subject 110A of the set of subjects in the 3D physical space. In at least one embodiment, the circuitry 202 may control the first set of image sensors, in the re-arranged rig 308, to capture the one or more images for generation of the one or more three-dimensional (3D) models of the first subject 110A of the set of subjects in the 3D physical space as described, for example, in FIGS. 3 (at 302G), 4A-4B, 5A-5B, 6A-6B, and 7A-7B. Control may pass to end.

Figure 10:
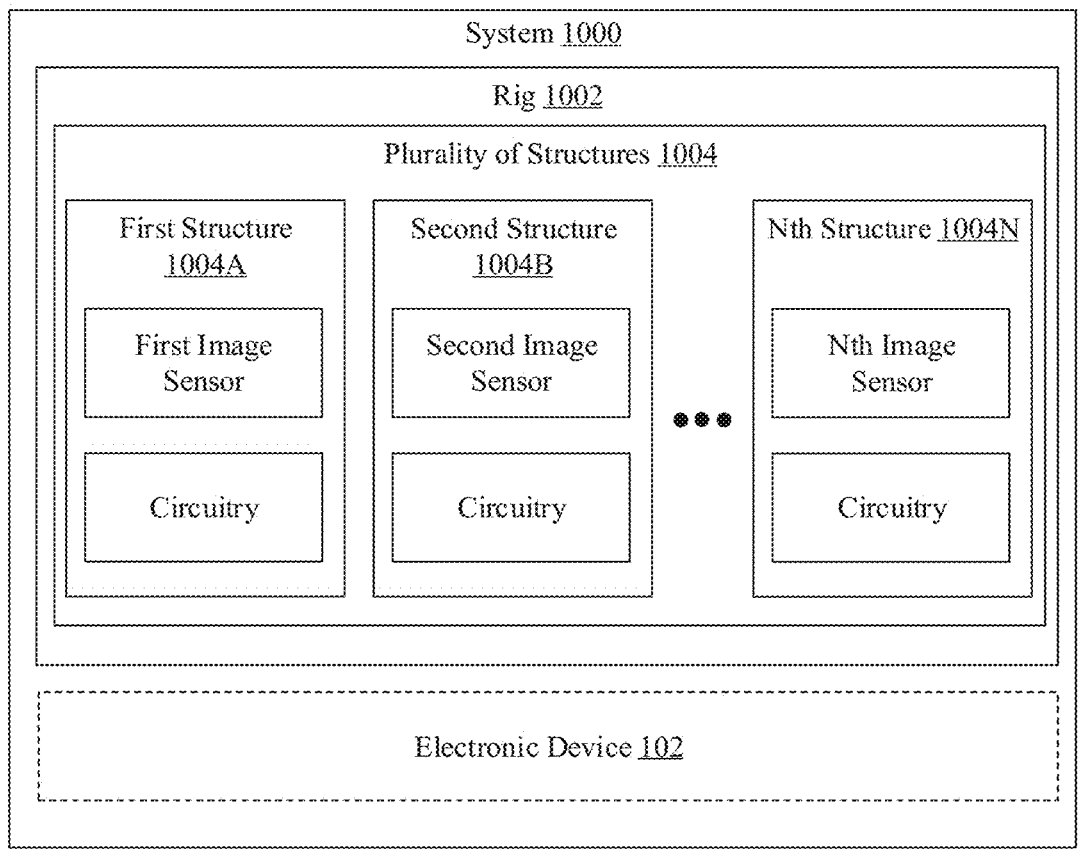
FIG. 10 is an exemplary block diagram of a system for programmable rig control for three-dimensional (3D) reconstruction, in accordance with an embodiment of the disclosure.

FIG. 10 is an exemplary block diagram of a system for programmable rig control for three-dimensional (3D) reconstruction, in accordance with an embodiment of the disclosure. FIG. 10 is explained in conjunction with elements from FIGS. 1, 2, 3, 4A, 4B, 5A, 5B, 6A, 6B, 7A, 7B, 8, and 9. With reference to FIG. 10, there is shown a system 1000 which may include a rig 1002. The rig 1002 may further include a plurality of structures 1004 which may further include a first structure 1004A, a second structure 1004B, and a Nth structure 1004N. Each of the plurality of structures 1004 may include at least one image sensor and circuitry.

The circuitry of one of the plurality of structures 1004 may control a first image sensor positioned on the first structure 1004A of the plurality of structures 1004. The first image sensor may be controlled to capture a first image of a first scene which may include a set of subjects in a 3D physical space as described, for example in FIG. 3 (at 302A). The circuitry may further feed a first input, that may include the captured first image of the first scene, to a neural network as described, for example in FIG. 3 (at 302B). The circuitry may further receive a first output from the neural network based on the fed first input as described, for example in FIG. 3 (at 302C). The received first output may include information about a re-arrangement of the rig 1002. The circuitry may further select one or more image sensors of a plurality of image sensors (i.e. including the first image sensor, a second image sensor, and a Nth image sensor, all included in the plurality of structures 1004) based on the received first output. The circuitry may further control a first set of structures associated with the selected one or more image sensors to re-arrange the rig 1002 around the 3D physical space as described, for example in FIG. 3 (at 302D and 302E). The circuitry may further control a first set of image sensors, in the re-arranged rig 1002, to capture one or more images for generation of one or more three-dimensional (3D) models of a first subject of the set of subjects in the 3D physical space as described, for example in FIG. 3 (at 302F and 302G).

Various embodiments of the disclosure may provide a non-transitory computer readable medium and/or storage medium having stored thereon, instructions executable by a machine and/or a computer to operate an electronic device (e.g., the electronic device 102) for programmable rig control for three-dimensional (3D) reconstruction. The instructions may cause the machine and/or computer to perform operations that include controlling a first image sensor (e.g., the first image sensor 108A) positioned on a first structure (e.g., the first structure 106A) of a plurality of structures sensor (e.g., the plurality of structures 106) which form a rig (e.g., the rig 104) around a three-dimensional (3D) physical space. The first image sensor may be controlled to capture a first image (e.g., the first image 304) of a first scene which includes a set of subjects (e.g., the set of subjects) in the 3D physical space. The operations further include feeding a first input, that includes the captured first image of the first scene, to a neural network (e.g., the neural network 112). The operations further include receiving a first output from the neural network based on the fed first input. The received first output may include information about a re-arrangement of the rig. The operations further include selecting one or more image sensors of a plurality of image sensors (e.g., the plurality of image sensors 108) based on the received first output. The operations further include controlling a first set of structures associated with the selected one or more image sensors to re-arrange the rig around the 3D physical space. The operations further include control a first set of image sensors in the re-arranged rig (e.g., the re-arranged rig 308) to capture one or more images for generation of one or more three-dimensional (3D) models of a first subject (e.g., the first subject 110A) of the set of subjects in the 3D physical space.

Certain embodiments of the disclosure may be found in an electronic device, a method, and a system for programmable rig control for three-dimensional (3D) reconstruction. Various embodiments of the disclosure may provide the electronic device 102 that may include circuitry 202 configured to control the first image sensor 108A positioned on the first structure 106A of the plurality of structures 106 which form the rig 104 around the 3D physical space. Each of the plurality of structures 106 may be in a triangular shape and may include at least one image sensor and at least one processing device as the electronic device. In some embodiments, each of the plurality of structures may be mounted on an unmanned aerial vehicle (UAV).

In accordance with an embodiment, the 3D physical space may further include a plurality of audio capture devices and a plurality of light sources, and wherein each of the plurality of audio capture devices and each of the plurality of light sources may be either associated with at least one image sensor of the plurality of image sensors 108 or is positioned on at least one structure of the plurality of structures 106.

The first image sensor may be controlled to capture the first image 304 of the first scene which may include the set of subjects in the 3D physical space. The circuitry 202 may be further configured to feed the first input that includes the captured first image 304 of the first scene to the neural network 112. The neural network 112 may be trained on a plurality of parameters to provide a first output for the re-arrangement of the rig 104. The plurality of parameters may include at least one of a count of the set of subjects, a movement of at least one subject of the set of subjects, a location of the at least one subject in the 3D physical space, a recognition of the at least one subject, an action of the at least one subject, an emotional state of a face of the at least one subject, an event in the 3D physical space, or historical information about the re-arrangement of the rig 104. In accordance with an embodiment, the neural network 112 may be further trained to provide the first output for the re-arrangement of the rig 104 based on a first resolution of the captured first image 304.

Based on the fed first input, the circuitry 202 may be further configured to receive the first output from the neural network 112. The first output may include information about a re-arrangement of the rig 104. Specifically, the first output may include at least one of, but is not limited to, a number of structures required to re-arrange the rig 104, information about a number of image sensors, information about a 3D position and an orientation of each image sensor of the first set of image sensors required for the re-arrangement of the rig 104 around the 3D physical space, information about a first set of imaging parameters associated with the selected one or more image sensors, or identification information about the selected one or more image sensors.

In accordance with an embodiment, the first output may further include at least one of, but is not limited to, information about a number of audio capture devices required to re-arrange the rig 104, information about a 3D position and an orientation of each of the first set of audio capture devices required for the re-arrangement of the rig 104 around the 3D physical space, information about a number of light sources required to re-arrange the rig 104, information about a 3D position and an orientation of each of the first set of light sources required for the re-arrangement of the rig 104 around the 3D physical space, information about a first set of audio parameters associated with the first set of audio capture devices, and information about a first set of lighting parameters associated with the first set of light sources.

In accordance with an embodiment, the first set of imaging parameters may include at least one of a focus parameter, a field-of-view (FoV) parameter, a zoom parameter, an f-stop parameter, an exposure parameter, a shutter speed parameter, an aperture parameter, a gain parameter, a backlight parameter, a brightness parameter, a contrast parameter, a white balance parameter, a sharpness parameter, a ISO sensitivity parameter, a noise reduction parameter, a demosaic parameter, a denoise parameter, a color parameter, a high dynamic range (HDR) parameter, a rotation (a tilt or an orientation) parameter, or a deblur parameter.

In accordance with an embodiment, the first set of lighting parameters may include at least one of a brightness parameter, a contrast parameter, a hue parameter, a tint parameter, a shade parameter, a tone parameter, a color temperature parameter, or a saturation parameter.

In accordance with an embodiment, the circuitry 202 may be further configured to select one or more image sensors of a plurality of image sensors 108 based on the received first output. In another embodiment, the circuitry 202 may be further configured to select at least one of a first set of audio capture devices from the plurality of audio capture devices or a first set of light sources from the plurality of light sources based on the received first output.

In accordance with an embodiment, the circuitry 202 may be further configured to control a first set of structures associated with the selected one or more image sensors to re-arrange the rig 104 around the 3D physical space. In another embodiment, the circuitry 202 may be configured to control a second set of structures associated with the selected first set of audio capture devices or the selected first set of light sources.

In accordance with an embodiment, the circuitry 202 may be configured to receive a user input, wherein the user input may include information about the one or more image sensors or information about the first set of structures. The circuitry 202 may be configured to control the first set of structures based on the received user input to re-arrange the rig 104 around the 3D physical space.

In accordance with an embodiment, the control of the first set of structures corresponds to either a removal of the first set of structures from the rig 104 to further update the plurality of structures 106 based on the removal or an addition of the first set of structures in the rig 104 to further update the plurality of structures 106 based on the addition. In another embodiment, the control of the second set of structures correspond to either a removal of the second set of structures from the rig 104 to further update the plurality of structures 106 based on the removal or an addition of the second set of structures in the rig 104 to further update the plurality of structures 106 based on the addition.

In accordance with an embodiment, a system for programmable rig control for three-dimensional (3D) reconstruction may be provided. The system may include the plurality of structures 106 which form the rig 104 around a three-dimensional (3D) physical space. Each of the plurality of structures 106 may include at least one image sensor, and circuitry, wherein the circuitry of one of the plurality of structures 106 may be configured to control the first image sensor 108A positioned on the first structure 106A of the plurality of structures 106. The first image sensor 108A may be controlled to capture the first image 304 of the first scene which includes the set of subjects in the 3D physical space. The circuitry may further feed the first input that includes the captured first image 304 of the first scene to the neural network 112. The circuitry may further receive the first output from the neural network 112 based on the fed first input. The received first output includes information about the re-arrangement of the rig 104. The circuitry may further receive select one or more image sensors of a plurality of image sensors 108 based on the received first output. The circuitry may further control the first set of structures associated with the selected one or more image sensors to re-arrange the rig 104 around the 3D physical space. The circuitry may further control the first set of image sensors in the re-arranged rig 308 to capture one or more images for generation of one or more three-dimensional (3D) models of a first subject 110A of the set of subjects in the 3D physical space.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that includes a portion of an integrated circuit that also performs other functions.

The present disclosure may also be embedded in a computer program product, which includes all the features that enable the implementation of the methods described herein, and which, when loaded in a computer system, is able to carry out these methods. Computer program, in the present context, means any expression, in any language, code or notation, of a set of instructions intended to cause a system with an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made, and equivalents may be substituted without deviation from the scope of the present disclosure. In addition, many modifications may be made to adapt a particular situation or material to the teachings of the present disclosure without deviation from its scope. Therefore, it is intended that the present disclosure is not limited to the particular embodiment disclosed, but that the present disclosure will include all embodiments falling within the scope of the appended claims.

What is claimed is:

1. An electronic device, comprising:
   circuitry configured to:
      control a first image sensor positioned on a first structure of a plurality of structures which form a rig around a three-dimensional (3D) physical space, wherein the first image sensor is controlled to capture a first image of a first scene which includes a set of subjects in the 3D physical space;
      feed a first input, that includes the captured first image of the first scene, to a neural network;
      receive a first output from the neural network based on the fed first input, wherein the received first output includes information about a re-arrangement of the rig;
      select one or more image sensors of a plurality of image sensors based on the received first output;
      control a first set of structures associated with the selected one or more image sensors to re-arrange the rig around the 3D physical space; and
      control a first set of image sensors, in the re-arranged rig, to capture one or more images for generation of one or more three-dimensional (3D) models of a first subject of the set of subjects in the 3D physical space.

2. The electronic device according to claim 1, wherein each of the plurality of structures is in a triangular shape and includes at least one image sensor and at least one processing device as the electronic device.

3. The electronic device according to claim 1, wherein each of the plurality of structures is mounted on an unmanned aerial vehicle (UAV).

4. The electronic device according to claim 1, wherein the control of the first set of structures corresponds to:

removal of the first set of structures from the rig to further update the plurality of structures based on the removal; or addition of the first set of structures in the rig to further update the plurality of structures based on the addition.

5. The electronic device according to claim 1, wherein the received first output comprises at least one of information about a number of structures required to re-arrange the rig, information about a number of image sensors, information about a 3D position and an orientation of each image sensor of the first set of image sensors required for the re-arrangement of the rig around the 3D physical space, information about a first set of imaging parameters associated with the selected one or more image sensors, or identification information about the selected one or more image sensors.

6. The electronic device according to claim 5, wherein the first set of imaging parameters comprise at least one of a focus parameter, a field-of-view (FoV) parameter, a zoom parameter, an f-stop parameter, an exposure parameter, a shutter speed parameter, an aperture parameter, a gain parameter, a backlight parameter, a brightness parameter, a contrast parameter, a white balance parameter, a sharpness parameter, a ISO sensitivity parameter, a noise reduction parameter, a demosaic parameter, a denoise parameter, a color parameter, a high dynamic range (HDR) parameter, a rotation (a tilt or an orientation) parameter, or a deblur parameter.

7. The electronic device according to claim 1, wherein the neural network is trained on a plurality of parameters to provide the first output for the re-arrangement of the rig; and wherein the plurality of parameters include at least one of a count of the set of subjects, a movement of at least one subject of the set of subjects, a location of the at least one subject in the 3D physical space, a recognition of the at least one subject, an action of the at least one subject, an emotional state of a face of the at least one subject, an event in the 3D physical space, or historical information about the re-arrangement of the rig.

8. The electronic device according to claim 1, wherein the neural network is further trained to provide the first output for the re-arrangement of the rig based on a first resolution of the captured first image.

9. The electronic device according to claim 1, wherein the rig further includes a plurality of audio capture devices and a plurality of light sources, and wherein each of the plurality of audio capture devices and each of the plurality of light sources is either associated with at least one image sensor of the plurality of image sensors or is positioned on at least one structure of the plurality of structures.

10. The electronic device according to claim 9, wherein the circuitry is further configured to:

select at least one of a first set of audio capture devices from the plurality of audio capture devices or a first set of light sources from the plurality of light sources based on the received first output; and control a second set of structures associated with the selected first set of audio capture devices or the selected first set of light sources.

11. The electronic device according to claim 10, wherein the control of the second set of structures includes:

removal of the second set of structures from the rig to further update the plurality of structures based on the removal; or addition of the second set of structures in the rig to further update the plurality of structures based on the addition.

12. The electronic device according to claim 10, wherein the received first output further comprises at least one of information about a number of audio capture devices required to re-arrange the rig, information about a 3D position and an orientation of each of the first set of audio capture devices required for the re-arrangement of the rig around the 3D physical space, information about a number of light sources required to re-arrange the rig, information about a 3D position and an orientation of each of the first set of light sources required for the re-arrangement of the rig around the 3D physical space, information about a first set of audio parameters associated with the first set of audio capture devices, or information about a first set of lighting parameters associated with the first set of light sources.

13. The electronic device according to claim 12, wherein the first set of lighting parameters comprises at least one of a brightness parameter, a contrast parameter, a hue parameter, a tint parameter, a shade parameter, a tone parameter, a color temperature parameter, or a saturation parameter.

14. The electronic device according to claim 1, wherein the circuitry is further configured to:

receive a user input, wherein the user input includes information about the one or more image sensors or information about the first set of structures; and control the first set of structures based on the received user input, to re-arrange the rig around the 3D physical space.

15. A method, comprising:

in an electronic device:

controlling a first image sensor positioned on a first structure of a plurality of structures which form a rig around a three-dimensional (3D) physical space, wherein the first image sensor is controlled to capture a first image of a first scene which includes a set of subjects in the 3D physical space;

feeding a first input, that includes the captured first image of the first scene, to a neural network;

receiving a first output from the neural network based on the fed first input, wherein the received first output includes information about a re-arrangement of the rig;

selecting one or more image sensors of a plurality of image sensors based on the received first output;

controlling a first set of structures associated with the selected one or more image sensors to re-arrange the rig around the 3D physical space; and controlling a first set of image sensors, in the re-arranged rig, to capture one or more images for generation of one or more three-dimensional (3D) models of a first subject of the set of subjects in the 3D physical space.

16. The method according to claim 15, wherein each of the plurality of structures is in a triangular shape and includes at least one image sensor and at least one processing device as the electronic device.

17. The method according to claim 15, wherein the received first output comprises at least one of information about a number of structures required to re-arrange the rig, information about a number of image sensors, information about a 3D position and an orientation of each image sensor of the first set of image sensors required for the re-arrangement of the rig around the 3D physical space, information about a first set of imaging parameters associated with the selected one or more image sensors, or identification information about the selected one or more image sensors.

18. The method according to claim 15, wherein the controlling the first set of structures corresponds to:

removing the first set of structures from the rig to further update the plurality of structures based on the removal; or adding the first set of structures in the rig to further update the plurality of structures based on the addition.

19. The method according to claim 15, wherein the neural network is trained on a plurality of parameters to provide the first output for the re-arrangement of the rig; and wherein the plurality of parameters include at least one of a count of the set of subjects, a movement of at least one subject of the set of subjects, a location of the at least one subject in the 3D physical space, a recognition of the at least one subject, an action of the at least one subject, an emotional state of a face of the at least one subject, an event in the 3D physical space, or historical information about the re-arrangement of the rig.

20. A system, comprising:
a plurality of structures which form a rig around a three-dimensional (3D) physical space, wherein each of the plurality of structures includes at least one image sensor, and circuitry,
wherein the circuitry of one of the plurality of structures is configured to:

control a first image sensor positioned on a first structure of the plurality of structures, wherein the first image sensor is controlled to capture a first image of a first scene which includes a set of subjects in the 3D physical space;

feed a first input, that includes the captured first image of the first scene, to a neural network;

receive a first output from the neural network based on the fed first input, wherein the received first output includes information about a re-arrangement of the rig;

select one or more image sensors of a plurality of image sensors based on the received first output;

control a first set of structures associated with the selected one or more image sensors to re-arrange the rig around the 3D physical space; and control a first set of image sensors, in the re-arranged rig, to capture one or more images for generation of one or more three-dimensional (3D) models of a first subject of the set of subjects in the 3D physical space.

* * * * *